US008505878B2

(12) United States Patent
Barthold

(10) Patent No.: US 8,505,878 B2
(45) Date of Patent: Aug. 13, 2013

(54) APPARATUS AND METHOD FOR ENHANCING THE RECONDUCTORING OF OVERHEAD ELECTRIC POWER LINES

(76) Inventor: Lionel O. Barthold, Lake George, NY (US)

( * ) Notice: Subject to any disclaimer, the term of this patent is extended or adjusted under 35 U.S.C. 154(b) by 957 days.

(21) Appl. No.: 12/062,672

(22) Filed: Apr. 4, 2008

(65) Prior Publication Data
US 2008/0246010 A1 Oct. 9, 2008

Related U.S. Application Data

(60) Provisional application No. 60/910,259, filed on Apr. 5, 2007.

(51) Int. Cl.
B63B 35/03 (2006.01)
B65H 59/00 (2006.01)
E21C 29/16 (2006.01)
H02G 1/08 (2006.01)
H02G 1/02 (2006.01)
H01R 43/00 (2006.01)
H02G 1/04 (2006.01)

(52) U.S. Cl.
USPC .......... 254/134.3 R; 254/214; 254/134.3 PA; 29/868

(58) Field of Classification Search
USPC ................. 254/134.3 R, 214, 134.3 PA, 395; 29/868, 869, 870
See application file for complete search history.

(56) References Cited

U.S. PATENT DOCUMENTS

| 1,520,628 | A | * | 12/1924 | Anderson | 254/214 |
| 2,188,715 | A | * | 1/1940 | Ingram | 254/134.3 PA |
| 2,680,394 | A | * | 6/1954 | Andren | 81/9.51 |
| 2,929,136 | A | * | 3/1960 | Andren | 29/417 |
| 3,030,075 | A | * | 4/1962 | Kocalis | 254/134.3 R |
| 3,073,574 | A | * | 1/1963 | Garnett | 254/214 |
| 3,137,765 | A | * | 6/1964 | Lanum | 174/90 |
| 3,271,009 | A | * | 9/1966 | Wright et al. | 254/134.3 R |

(Continued)

FOREIGN PATENT DOCUMENTS
WO WO 2004/079877 9/2004

OTHER PUBLICATIONS

Black, R.C., et al., A Live Line Method for Retensioning Transmission Line Conductors, CIGRE, Int'l Conference, 1970 Session, Aug. 24-Sep. 2.

(Continued)

Primary Examiner — Lee D Wilson
Assistant Examiner — Alvin Grant
(74) Attorney, Agent, or Firm — Brian M. Dingman; Dingman IP Law, PC

(57) ABSTRACT

Equipment and associated methods for replacing existing overhead transmission line conductors with new ones while the transmission line remains in service and carrying power. The old conductor is used to pull the new conductor through a series of sheaves installed at the bottom of the insulator at each tower. Conventional tension-stringing equipment is used but it is elevated to line potential that is achieved by use of an insulating platform or insulating jacks. Current transfer between stationary and moving conductors is achieved by a current transfer device that may consist of transmission line contacting wheels and liquid metal contactors. Sag control in various conductor spans is enhanced by a stringing block with controllable friction. Equipment is also introduced which will prevent release of the conductor by the pulling device should it break while engaged by that device.

17 Claims, 26 Drawing Sheets

(56) References Cited

U.S. PATENT DOCUMENTS

| | | | |
|---|---|---|---|
| 3,708,779 A * | 1/1973 | Enright et al. | 439/392 |
| 3,753,284 A * | 8/1973 | Olsen et al. | 29/870 |
| 4,343,443 A * | 8/1982 | Grounds | 242/419.9 |
| 4,531,714 A * | 7/1985 | Bahr | 254/134.3 R |
| 4,596,379 A * | 6/1986 | Saracini | 254/134.3 PA |
| 4,661,662 A | 4/1987 | Finke et al. | |
| 4,814,550 A * | 3/1989 | Newberg | 174/138 R |
| 5,029,816 A * | 7/1991 | Langston | 254/134.3 FT |
| 5,538,207 A * | 7/1996 | O'Connell et al. | 248/49 |
| 5,661,903 A * | 9/1997 | Mercurio | 29/868 |
| 6,325,749 B1 * | 12/2001 | Inokuchi et al. | 483/13 |
| 6,837,671 B2 * | 1/2005 | Devine et al. | 414/680 |
| 7,353,602 B2 * | 4/2008 | McCullough et al. | 29/869 |
| 7,535,132 B2 * | 5/2009 | Devine et al. | 307/147 |
| 7,546,680 B2 * | 6/2009 | Barthold | 29/745 |
| 7,882,630 B2 * | 2/2011 | McCullough et al. | 29/869 |
| 2002/0100898 A1 * | 8/2002 | Knoerzer et al. | 254/134.3 R |
| 2003/0098450 A1 * | 5/2003 | Cook et al. | 254/134.3 R |
| 2005/0133244 A1 | 6/2005 | Devine et al. | |
| 2006/0033463 A1 | 2/2006 | Rodnunsky et al. | |
| 2007/0056463 A1 | 3/2007 | Rodnunsky | |
| 2008/0246010 A1 * | 10/2008 | Barthold | 254/134.3 R |
| 2009/0195083 A1 * | 8/2009 | Devine et al. | 307/147 |
| 2009/0206305 A1 * | 8/2009 | Devine et al. | 254/134.3 PA |

OTHER PUBLICATIONS

IEEE Guide to the Installation of Overhead Transmission Line Conductors, IEEE Std. 524-2003, Published Mar. 12, 2004.

* cited by examiner

APPARATUS AND METHOD FOR ENHANCING THE RECONDUCTORING OF OVERHEAD ELECTRIC POWER LINES

CROSS REFERENCE TO RELATED APPLICATION

This application claims priority of Provisional Application Ser. No. 60/910,259, filed on Apr. 5, 2007. The entire contents of this prior application are incorporated herein by reference.

FIELD OF THE INVENTION

This invention pertains to the installation of electrical cables or conductors onto towers of high voltage electric power lines.

BACKGROUND OF THE INVENTION

In many electric power networks, the growth in generating capacity has outstripped the growth in construction of new transmission lines. This has caused power system design specialists to seek ways to allow existing transmission lines to carry more power. One means of doing so is the replacement of old conductors with new conductors of higher current-carrying capacity. The new conductors may simply be larger if the towers are capable of carrying the extra weight and wind loading. Where the towers are not capable of doing so, special conductors capable of carrying more current with the same or less elongation are now available. These special conductors allow operation at a much higher temperature without posing a safety hazard by exceeding sag limits. Unfortunately, the lines which are the most urgent candidates for re-conductoring are also those which are the most difficult to remove from service, a problem which this invention addresses.

DESCRIPTION OF THE PRIOR ART

The field of prior art deals largely with methods and equipment for putting transmission line conductors into place (stringing) before a line has been commissioned and energized with voltage. The prior art has evolved to the point where it is common to transfer the conductor directly from the conductor supply reel to its overhead position by means of a transportable "tensioner" or brake at the conductor supply end and a transportable "puller" or winch at the conductor pulling end. The tensioner provides sufficient resistance to the pulling force to assure that the conductor does not touch the ground, thus avoiding nicks and scratches that are sources of electrical discharges or corona once the conductor is energized. Tension stringing equipment is supplied by a number of commercial enterprises.

FIG. 1 illustrates the context of a conventional prior art conductor stringing operation, which in this case is presumed to proceed from right to left. It presumes that tower 200 and all towers to the right of tower 200 have already been strung with conductor 8; attached at each tower to the bottom of insulator strings 10 with permanent clamps 13. It presumes that a section of line between towers 201 and 220 is now to be strung and that tower 221 and those to the left of tower 221 will be strung in a subsequent stringing operation. Towers 200 and 201 are adjacent to one another, as are towers 220 and 221. Stringing blocks 9 have been affixed to the bottom of insulator strings 10 on towers 201 through 220, and a lead cable 11 has been threaded through them in preparation for pulling the permanent conductor into place.

FIG. 2 illustrates a puller 70 in place, pulling the lead cable 11, which extends to the right of tower 220, attached by coupler 6 to conductor 8 near the end of the pull. The puller 70 wraps the lead cable around two "bull wheels," to gain enough friction to affect the pull.

FIG. 3 illustrates the supply end of the pull as it begins. At that point the lead cable is tied to the new conductor 8, by means of a coupler 6. A tensioner 60 maintains enough braking resistance to prevent the conductor 8 from touching the ground along the section being strung. An incremental increase in pulling tension or decrease in braking tension causes the new conductor 8 to traverse the entire pulling section, after which the blocks 9 are replaced by permanent clamps 13 and the next section is readied for conductor installation.

Pulling and tensioning equipment, 70 and 60, respectively, are typically mounted on special trailers or truck-beds and constitute prior art with respect to installation of conductors on newly constructed transmission lines. In addition, to the foregoing prior art, there is a field of prior art dealing with "live-line" work; specifically change-out or repair of transmission line insulators and hardware while the line continues to be energized. Live-line maintenance and repair takes advantage of a variety of tools and equipment, including personnel "buckets" which can be elevated to conductor level on insulated booms. The bucket may then be deliberately connected to the high voltage line causing it to be at the same potential as the conductor or hardware and allowing maintenance personnel to safely put themselves in direct contact with the conductor or hardware. These techniques and equipment have also been used to adjust the sag of existing lines while they remain energized.

Only recently have means been proposed to replace the conductors over a long line section while a transmission line is still energized. US Patent application publication 20050133244 describes a way of doing so by establishing a spare (fourth) phase position paralleling the power line, onto which power can be diverted while a formerly active conductor, no longer under high voltage, can be replaced. This method has the disadvantages of (a) requiring the installation of temporary towers or support points the full length of the line section being strung, (b) relocation of an existing phase position to that tower or support point or stringing a new temporary phase position on that tower or support point, and (c) removal of all temporary apparatus and conductors following restringing of the section in question. It requires stringent safety precautions due to the voltage and current inductively coupled to new conductor as it is being strung.

The economic benefit of replacing old conductors with conductors of higher current-carrying capacity is very large. That recourse can avoid construction of new lines, suggesting that both the methods and the equipment used for conductor replacement be re-examined with an eye to reducing cost and shortening project time.

SUMMARY OF THE INVENTION

The invention is in part directed to the installation of new conductors by using the existing or old conductor to draw the replacement or new conductor into place. The invention comprises in part apparatus that facilitates the replacement operation to be carried out while the electric power line remains in service, energized at high voltage.

The invention comprises, in part, methods, and equipment to allow an old transmission line conductor to serve as the lead cable to draw a new conductor into place in its stead while, in one embodiment, both the conductors and the line itself continue to carry full current under full voltage. In the latter embodiment the supply reel of new conductor and associated tensioner are insulated from ground and maintained at line potential, as is the take-up reel and associated puller.

The invention differs from prior art in part in that it introduces new apparatus as well as equipment modifications, auxiliary equipment, and methods by which the old conductor can be cut, coupled to the new conductor, and used as a lead cable to pull the new conductor into place. In the preferred embodiment of this invention, new devices and new methods allow conductor replacement while providing a continuous path for current to flow over the line section being replaced, thus requiring no interruption of power flow. In another embodiment, the invention may achieve the replacement by restricting the power interruption to a very short duration.

For uninterrupted re-stringing, transfer of current from the already restrung line section to the new conductor while it is being installed and from the latter to the conductor on the yet to be restrung section is achieved by causing the new conductor to pass over and make contact with one or more conducting wheels from which it receives current. The wheel, which rotates as the conductor is pulled, receives its current by means of a rotating liquid metal rotating contactor which is, in turn, coupled to the fixed conductor at either end of the re-conductoring section.

BRIEF DESCRIPTION OF THE DRAWINGS

Other objects, features and advantages will occur to those skilled in the art from the following description of the preferred embodiments of the invention, and the accompanying drawings, in which like numbers are used for like parts, and wherein.

DETAILED DESCRIPTION OF EMBODIMENTS OF THE INVENTION

The System

The following paragraphs describe a number of operations that may be conducted at line potential. These procedures may be carried out from trucks with insulated booms, commonly used in transmission line maintenance and repair, or, in the case of operations in close proximity to the tower, by live-line tools designed for use from a grounded position.

Figure 1:
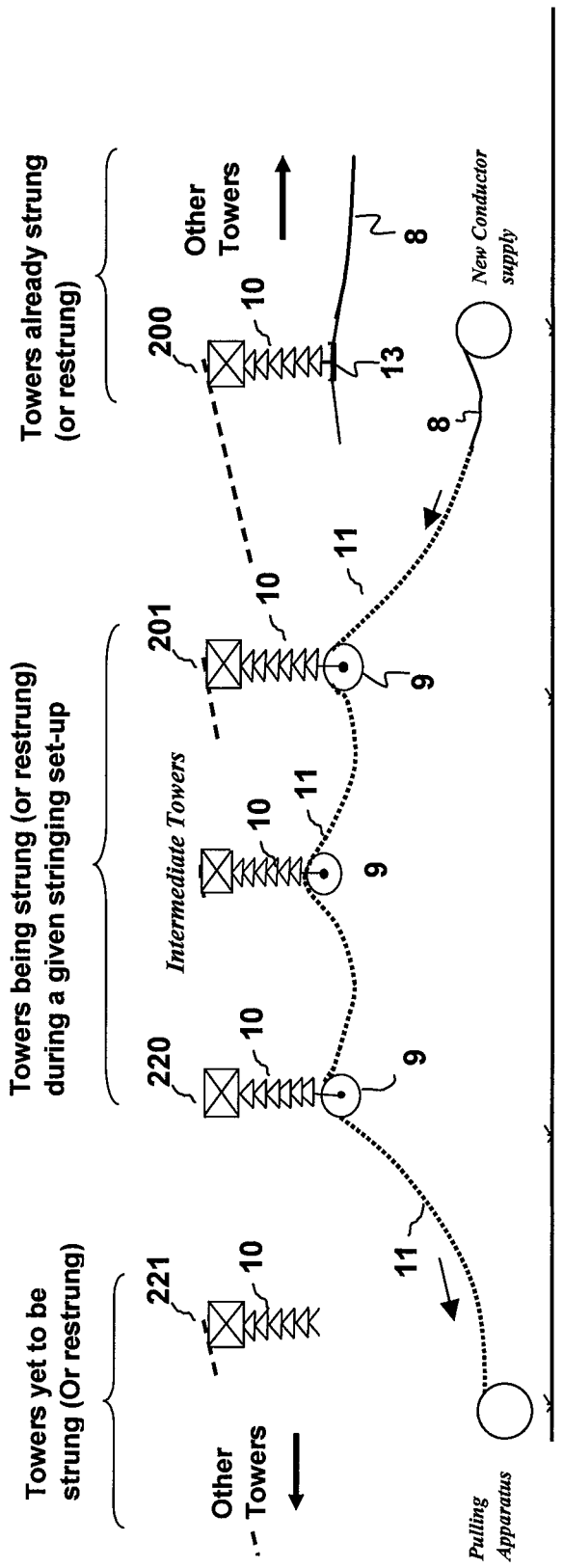
FIG. 1 illustrates a series of transmission line towers some of which are to be strung or restrung according to prior art.
Figure 2:
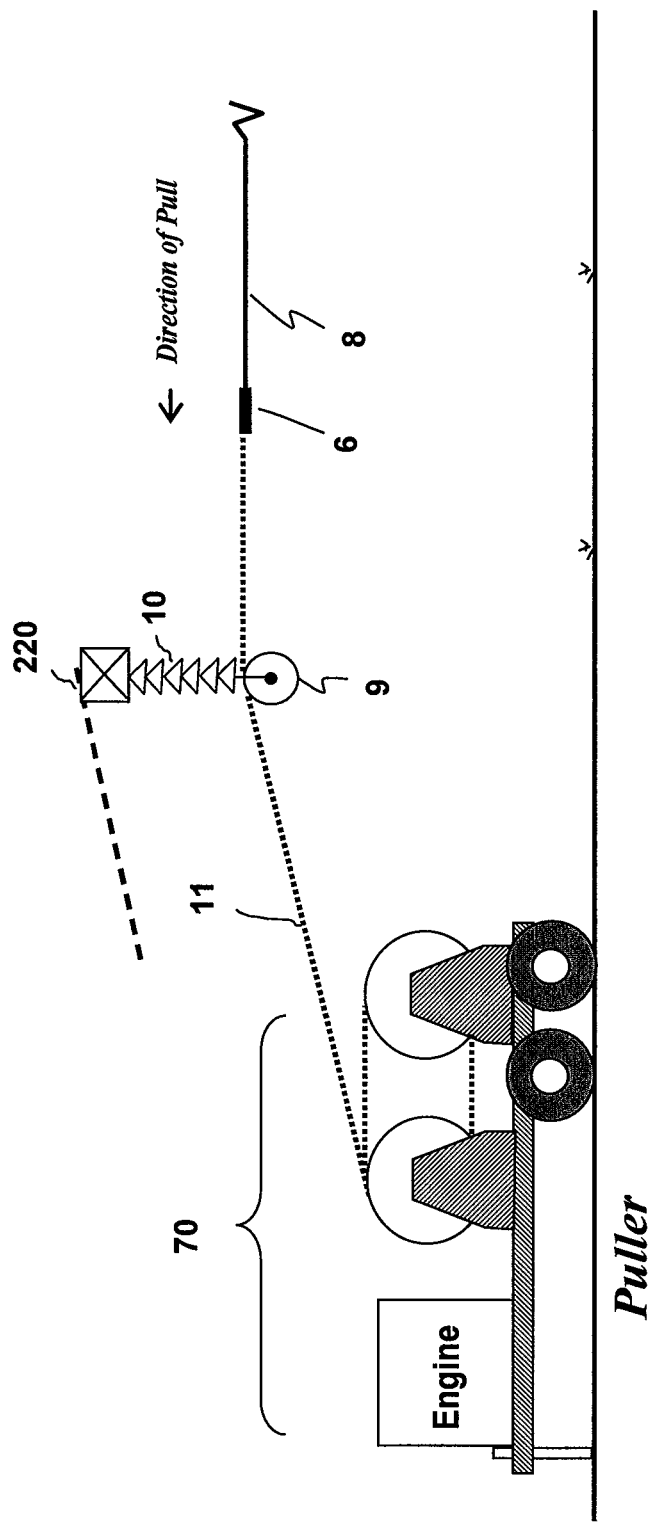
FIG. 2 illustrates the pulling end of the prior art tension stringing operation of FIG. 1.
Figure 3:
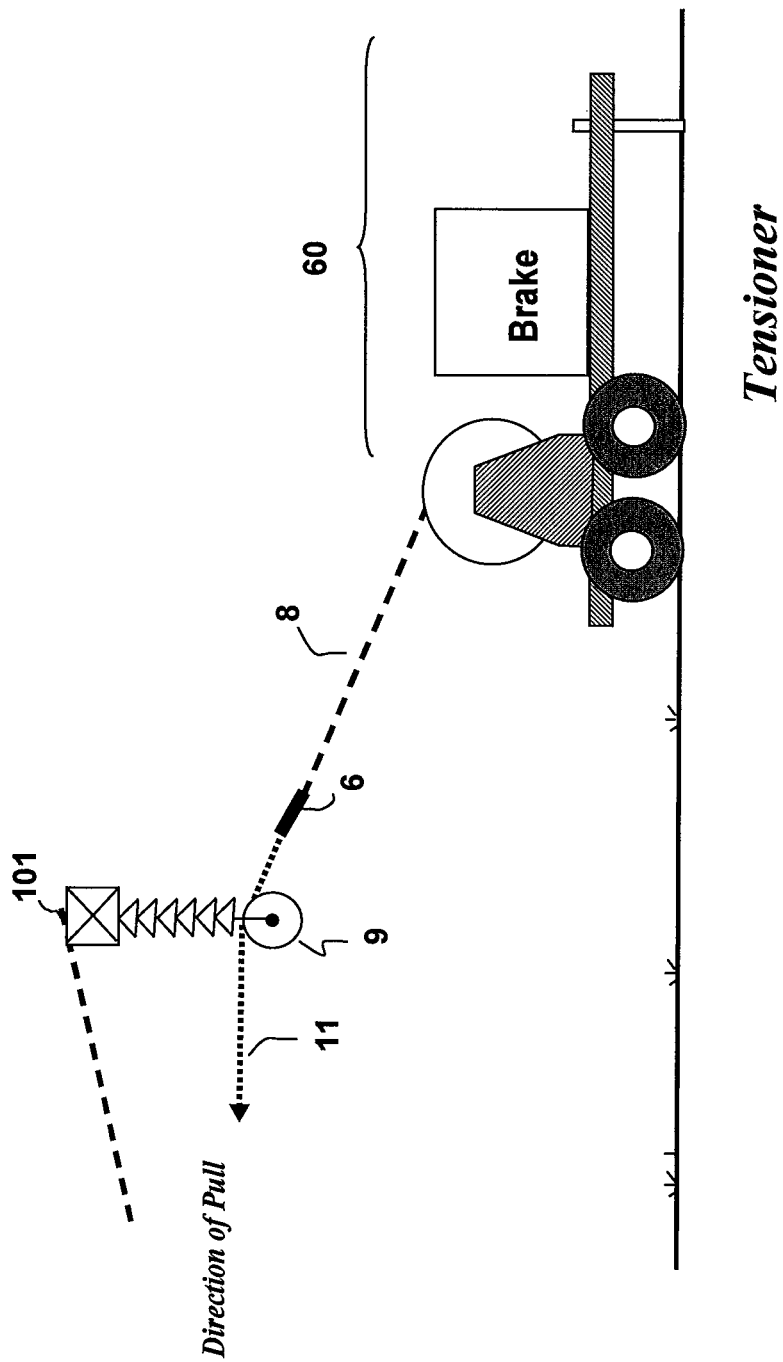
FIG. 3 illustrates the tensioning end of the prior art tension stringing operation of FIGS. 1 and 2.
Figure 4:
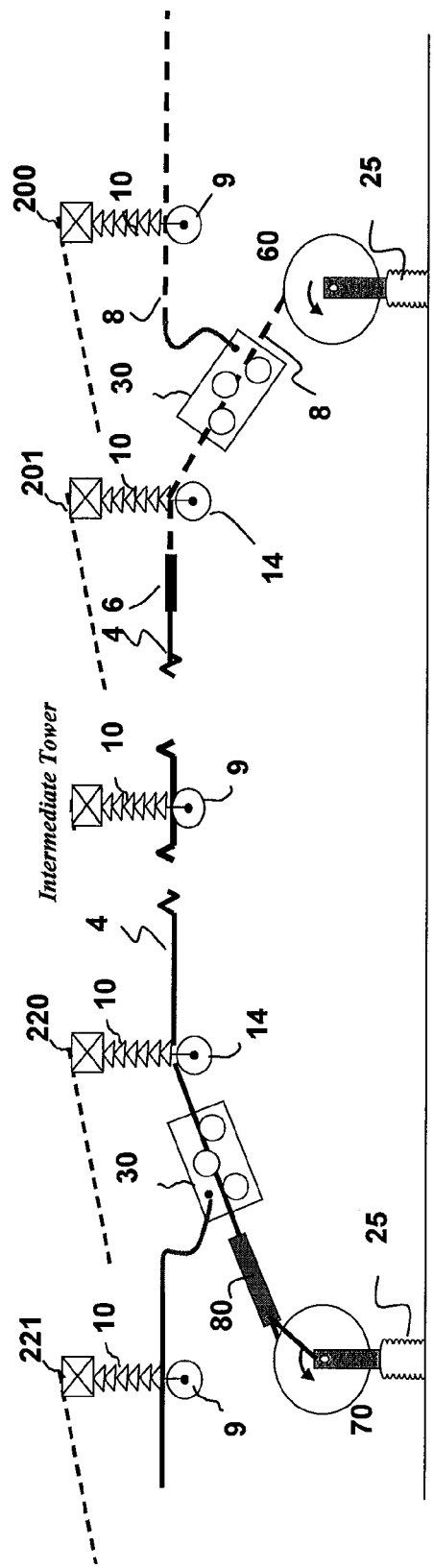
FIG. 4 illustrates an overview of an embodiment of the invention.

FIG. 4 is a simplified schematic diagram of an embodiment of the invention; a system in which an existing high-voltage conductor 4 is used to pull a new or replacement high-voltage conductor 8 into place in its stead. Details of the equipment and procedures are presented in subsequent paragraphs. FIG. 4 shows both the first tower 201 and the last tower 220 of the line section over which the previous conductor is to be replaced. Double sheave stringing blocks 14 have been attached to towers 201 and 220. Similar blocks with one sheave 9 have been installed on intermediate towers. In FIG. 4 the pulling function 70 will include (a) an engine or source of energy to pull the conductor, (b) a bull wheel or similar device to apply pulling tension to the lead cable 11 or old conductor 4 and (c) a take-up reel to store the conductor or lead wire accumulated at the pulling end of the stringing section. Likewise the tensioning function 60 will include (a) a braking system and method for releasing heat, (b) a bull wheel if necessary to sustain tension, and (c) a supply real of new conductor. All of the equipment described in this paragraph is known in the art. However implementation of the system constituting, in part, this invention requires that all puller and tensioner equipment, including take-up and supply reels, be insulated, and held at full line potential. This insulating function is indicated generally as 25 in FIG. 4.

FIG. 4 also shows a current transfer device 30 used for passing current from one or more conductors on the previously re-strung section (towers up to 200) to one or more conductors on the section now being re-strung, 201 to 220, and an identical device 30 which serves to transfer current from one or more conductors on the section being strung (towers 200 to 221) to one or more conductors suspended from towers 221 and higher; the section yet to be re-strung. The puller 70 in FIG. 4 also shows a device 80 to prevent release of the conductor in case it breaks within the puller. It will be useful to address the various functions in FIG. 4 in more detail.

Pulling and Tensioning Equipment

Figure 5:
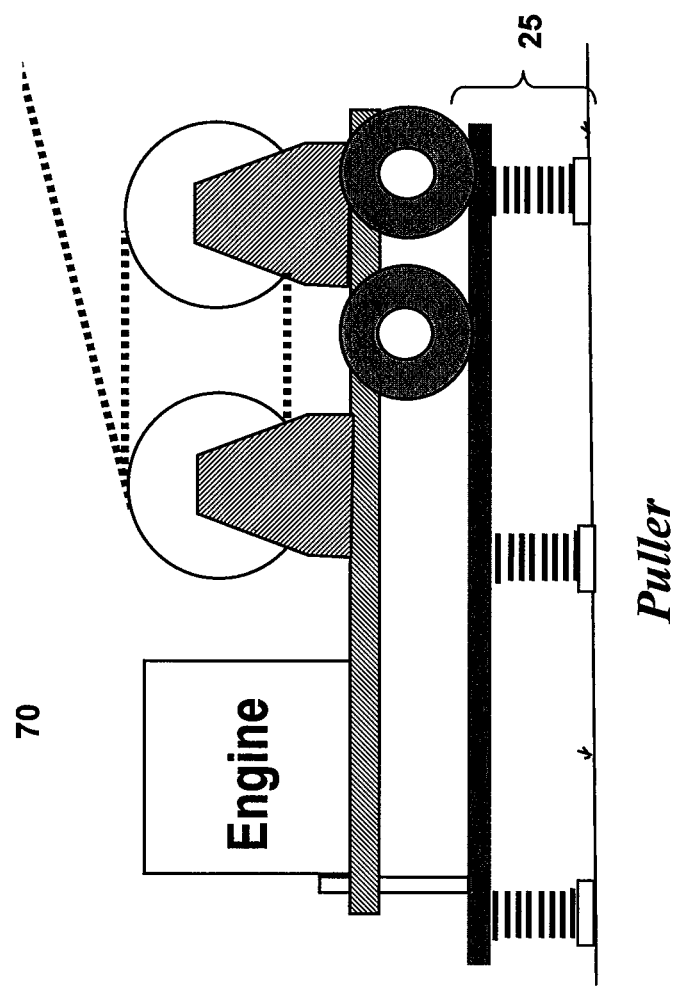
FIG. 5 illustrates the insulation of the puller in the embodiment of the invention of FIG. 4.
Figure 6:
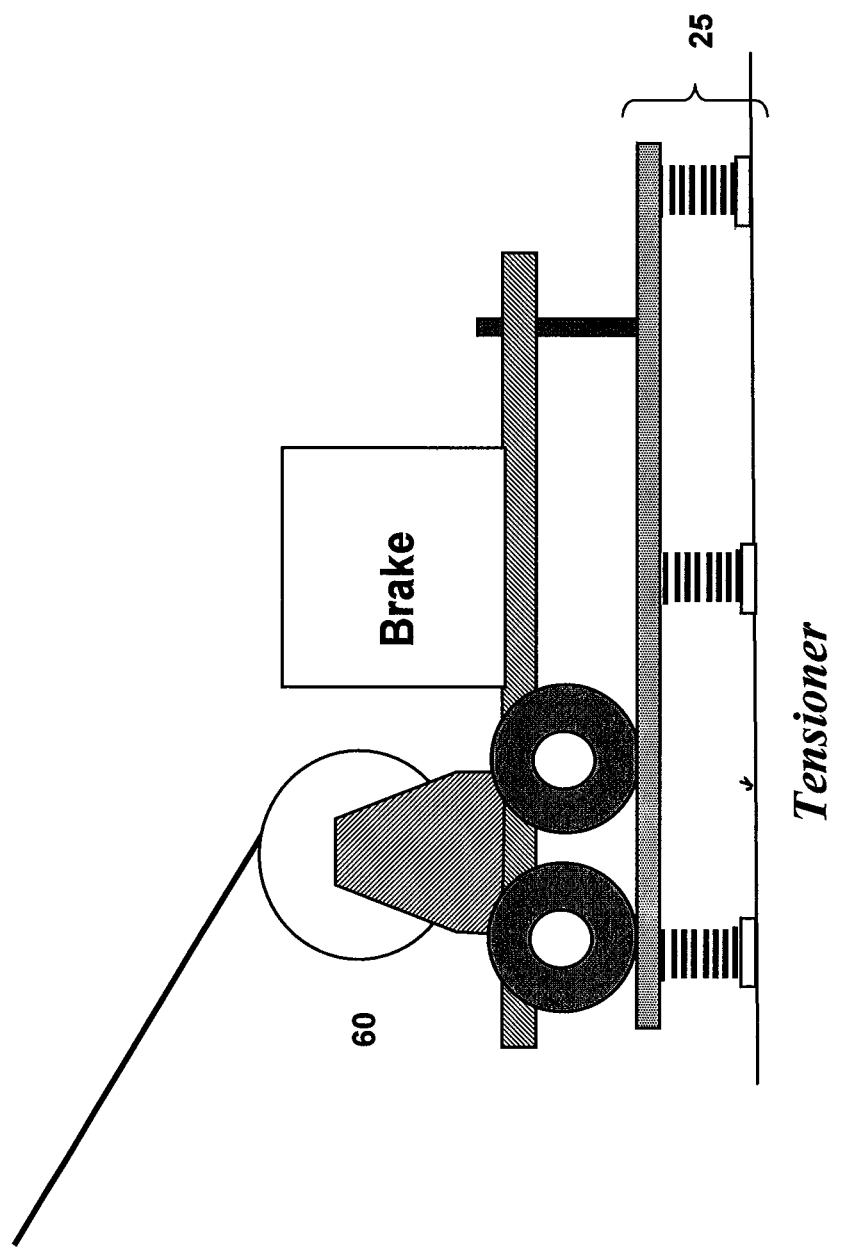
FIG. 6 illustrates the insulation of the tensioner in the embodiment of the invention of FIGS. 4 and 5.

This invention makes use of conventional pulling and tensioning equipment with the exception that (a) some of the equipment must be remotely controlled, and (b) that equipment must be insulated from ground. FIG. 5 shows a simple insulated platform 25 provided for that purpose. That platform would be equipped with a removable boarding ramp (not shown). Alternatively (not shown) conventional pullers and tensioners may be provided with jacks to mount the chassis on insulators. FIG. 6 shows the same insulated platform set up at the tensioner 60.

Current Transfer Device

Figure 7:
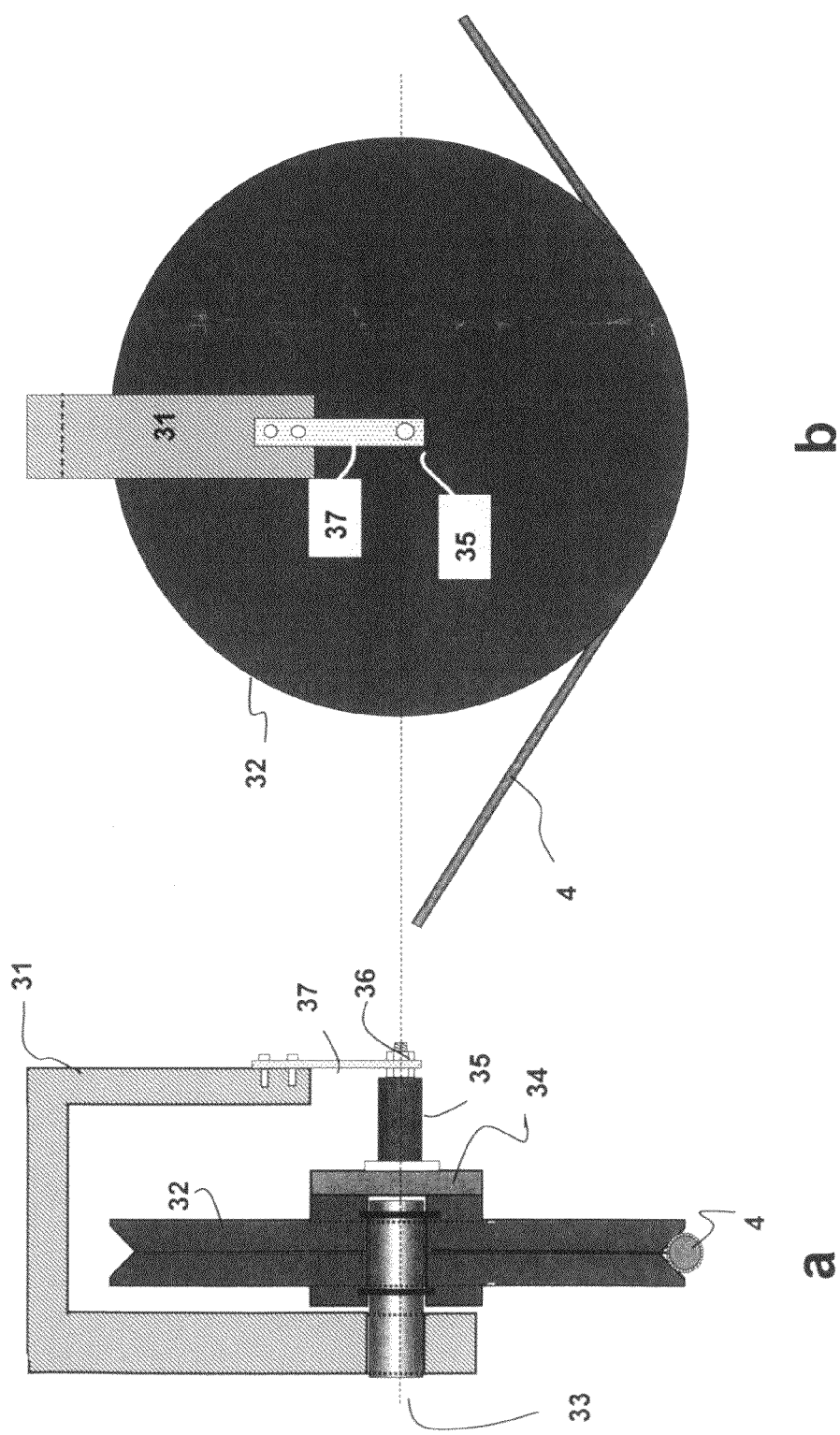
FIGS. 7*a* and 7*b* illustrate a single contactor current transfer system for an embodiment of the invention.

FIGS. 7a and 7b show an embodiment of the invention, detailing the points of current transfer identified as 30 in FIG. 4. Conductor 4 is caused to come into contact with a conductive contactor wheel 32 over a portion of its periphery (FIG. 7b). Such conductors are composed of individual strands, typically in the order of ⅛ inch in diameter, spirally wound— usually with steel strands in the center. Thus contact between the conductor 4 and the contactor wheel 32 is on a strand-by-strand basis, so that the number of strands making contact with the wheel at a given time is important. In order to double the number of strands making contact per inch of wheel periphery, wheel 32 is built with a V-shaped peripheral groove, thus allowing conductor contact on two planes rather than one. Contactor wheel 32 rotates about a cantilevered axle 33 supported on one side by the frame 31. A conducting faceplate 34 provides a current path from the wheel itself to one end of a liquid metal rotating contactor 35, thus avoiding the need for current to pass through the axle 33. The embodiment shown in FIG. 7 presumes that the axle 33 is made of an insulating material, e.g. a high strength ceramic, to block current flow through the axle itself. Other embodiments could place an insulating barrier within the frame 31 for that purpose. The main body of the contactor 35 rotates while its end shaft 36 remains stationary, current passing from one to the other through liquid metal within the contactor. Such contactors are commercially available in the United States for currents up to 250 amperes. (available from Mercotac, Inc. of Carlsbad, Calif.; on the web at www.mercotac.com) and in Asia for 650 amperes (available from Shanghai Bige M&E Co., Ltd, Shanghai, China; on the web at www.asiantool.com.). They conduct current either while rotating or standing still, thus allowing pauses in the stringing operation; a recourse which would have to be accommodated by a by-pass disconnect switch with conventional brush slip-ring methods of current transfer.

The fixed end 36 of the rotating contactor 35 is attached, by a semi-rigid conducting bar 37 to the contactor device frame 31, allowing current to flow in that path. From that frame it may be made to flow to other points as discussed later in this document, e.g., the conductor to the left or to the right of the stringing operation.

Figure 8:
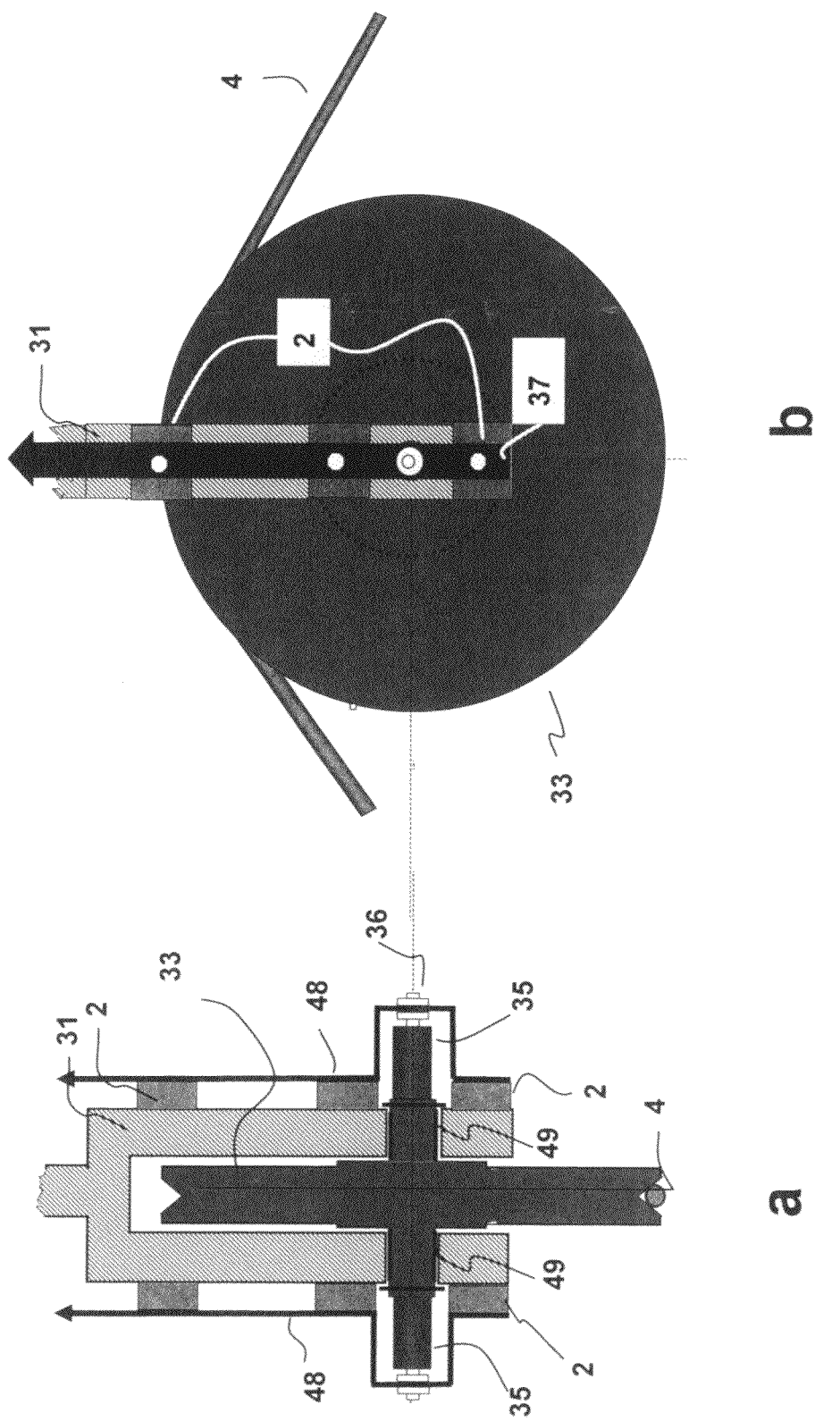
FIGS. 8*a* and 8*b* illustrate a double contactor current transfer system for an embodiment of the invention.

FIGS. 8a and 8b show another embodiment, similar to that shown in FIG. 7 but capable of transferring twice the current. It does so by means of two rotating contactors 35 connected in parallel. In this case the contactor wheel, 33, has been modified to also serve as its own axle or, alternatively, to make good electrical contact with a separate axle of high electrical conductivity. Metal sleeves 49 or special bearing inserts may be necessary to support the axle mechanically. Current passes from the conductor 4, to the contactor wheel 33 directly to each of two rotating contactors 35 mounted on two axle extensions of the contactor wheel. A semi-rigid conducting bar 48, insulated from the support frame 31 by insulating blocks 2, is provided to conduct current from the outer axle of each rotating contactor to an external fixed point.

Figure 9:
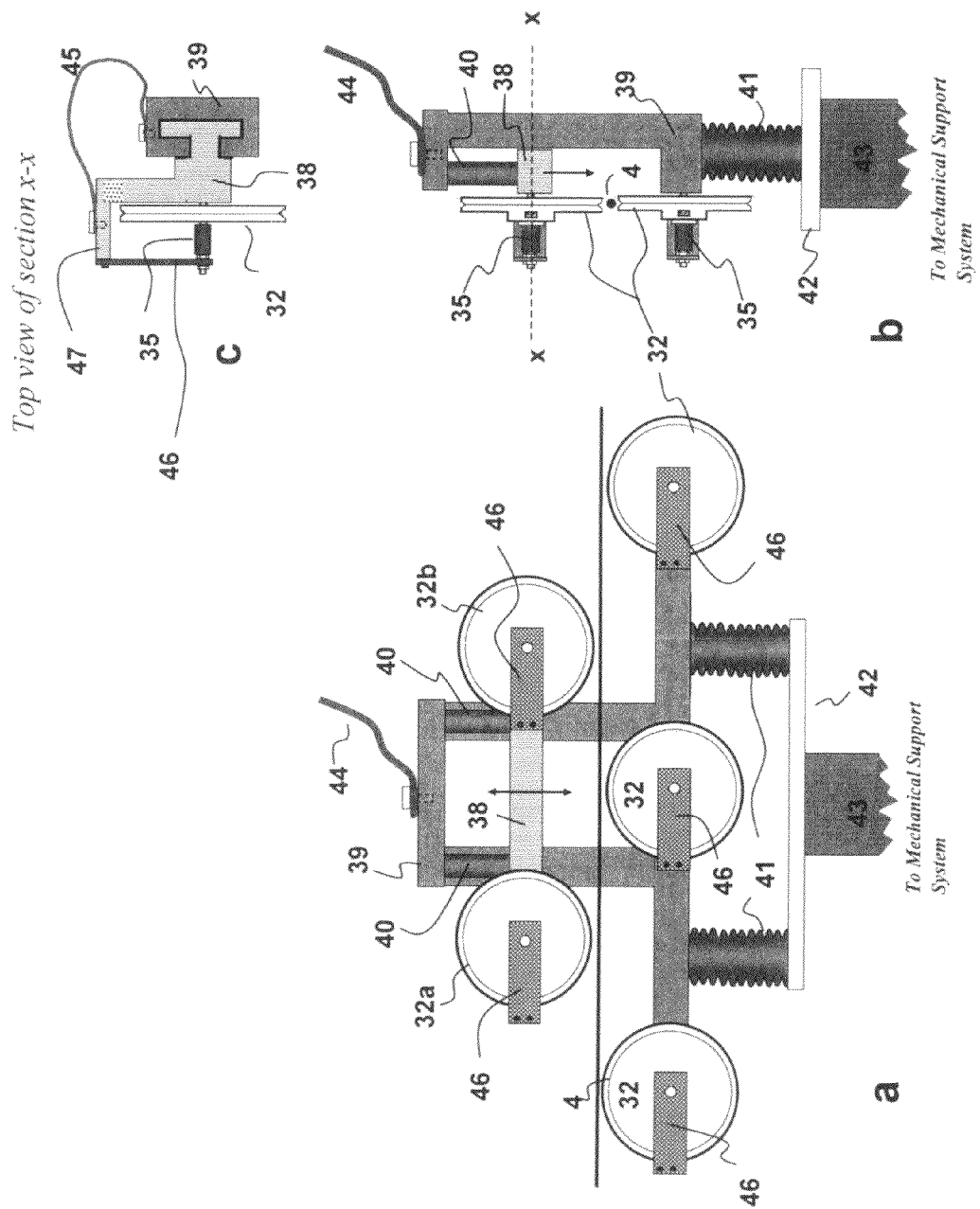
FIGS. 9*a*, 9*b* and 9*c* illustrate the current transfer device of FIG. 8, in the open position.

FIGS. 9 a, b, and c show more comprehensive illustration of the embodiment of the configuration illustrated in FIG. 7 and the current transfer device cited as 30 in FIG. 4. The objective of the current transfer device is to carry current from a moving conductor 4 to the stationary output jumper 44. FIG. 9 shows the current transfer device prior to engagement with the conductor 4. The upper wheels are raised so the conductor 4 can be positioned between the two wheel sets.

The three lower contact wheels 32 in FIG. 9 are mounted on a fixed-position frame member 39. The upper two contactor wheels 32a and 32b are mounted on a movable frame member 38. The mode of motion of 38 is best illustrated by FIG. 9c, a top view of the current transfer device through cut x-x in FIG. 9 b. The movable frame 38 can move vertically by sliding in a slot cut into the fixed frame member 39. The vertical position of the movable frame member 38 is controlled by a prior art mechanical, hydraulic or pneumatic system (not shown), of a type that would be apparent to one skilled in the art.

FIGS. 10a and b show the current transfer device with upper frame 38 pushed down over the conductor 4 by the pneumatically or hydraulically controlled piston within the cylinder 40 so as to cause conductor 4 to make mechanical and electrical contact with a portion of the periphery of each wheel. Upon completion of the pull achieved by this system, upper wheels 32a and 32b are again raised and the current transfer device is relocated to another site. The same current transfer device design will serve either pulling or tensioning positions.

The path of current flow in FIGS. 10a and 10b is from the conductor 4, through the contact wheels 32 to the rotating end of the rotary switch 35, through that switch and out the stationary end of the switch 35 to a flexible jumper 46 shown in FIG. 9c (flexible to prevent mechanical stress on the rotary switch 35), through that jumper to an extension 47 of the either the movable frame member 38 in the case of contact wheels 32a and 32b or the stationary frame member 39 in the case of contact wheels 32, and from those frames to a fixed conductor by jumper 44. Both movable and stationary frames, 38 and 39, respectively, are maintained at the same electrical potential by jumper 45 shown in FIG. 9c. A current path exactly opposite to the above will apply at the opposite end of the pulling section.

Figure 10:
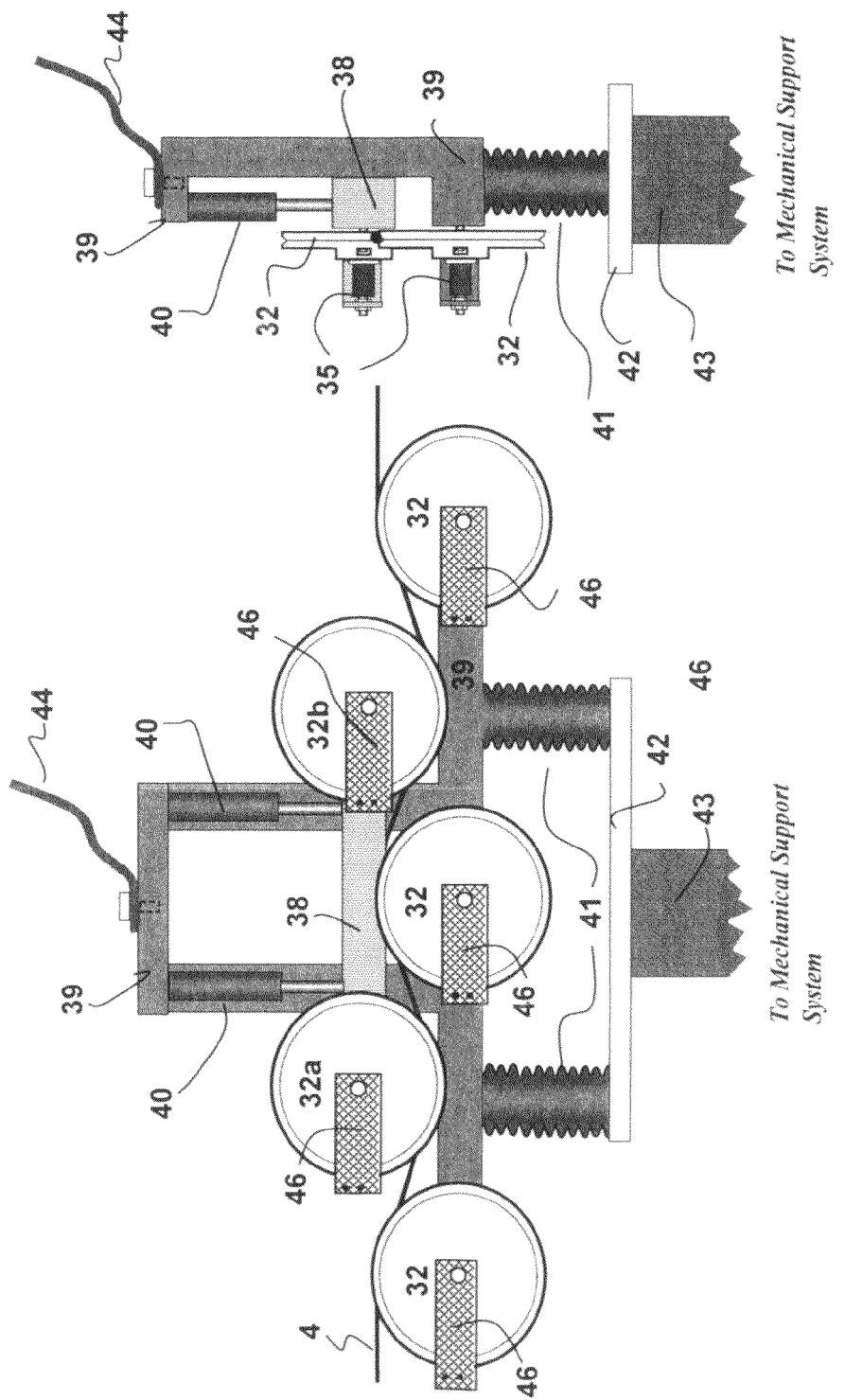
FIGS. 10*a* and 10*b* illustrate the current transfer device of FIGS. 8 and 9 in the closed position.

The radius of the current transfer wheels 32, 32a, and 32b in FIGS. 9 and 10, the number of upper and lower wheels, as well as the degree of closure of the current transfer system with the conductor engaged will be governed by the current transfer requirements of the system.

Figure 11:
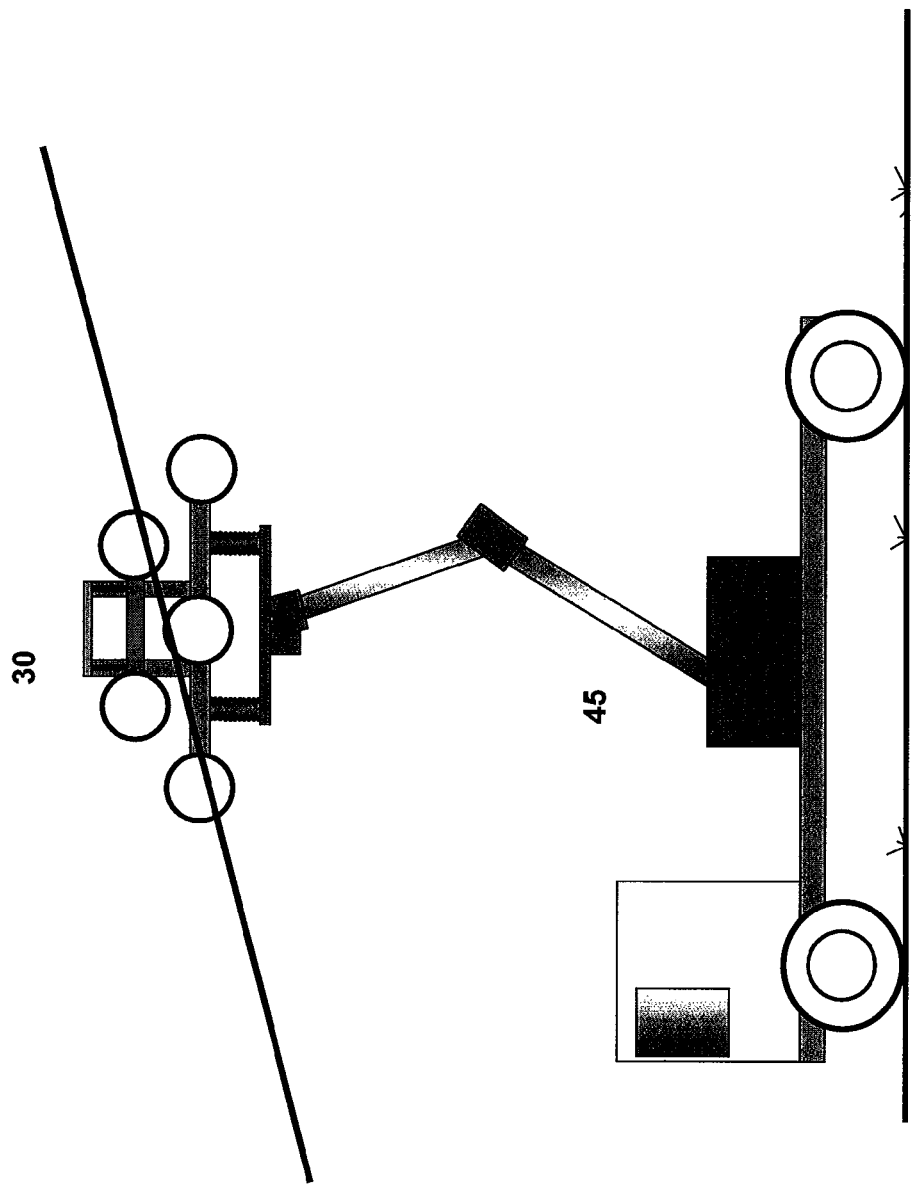
FIG. 11 illustrates a prior art mode of supporting the current transfer device in proximity to the conductor.

The current transfer device is mounted on insulators 41 the lower end of which attach to a support framework 42 which, in turn, is mounted on a support member 43. The latter may be either fixed or adjustable in height and position. FIG. 11 shows the current transfer device mounted on the end of a mobile boom capable of aligning the former with the conductor to or from which current is being transferred. Mobile boom devices of the type shown in FIG. 11 are prior art.

Preparation for Live Line Conductor Replacement

Figure 12:
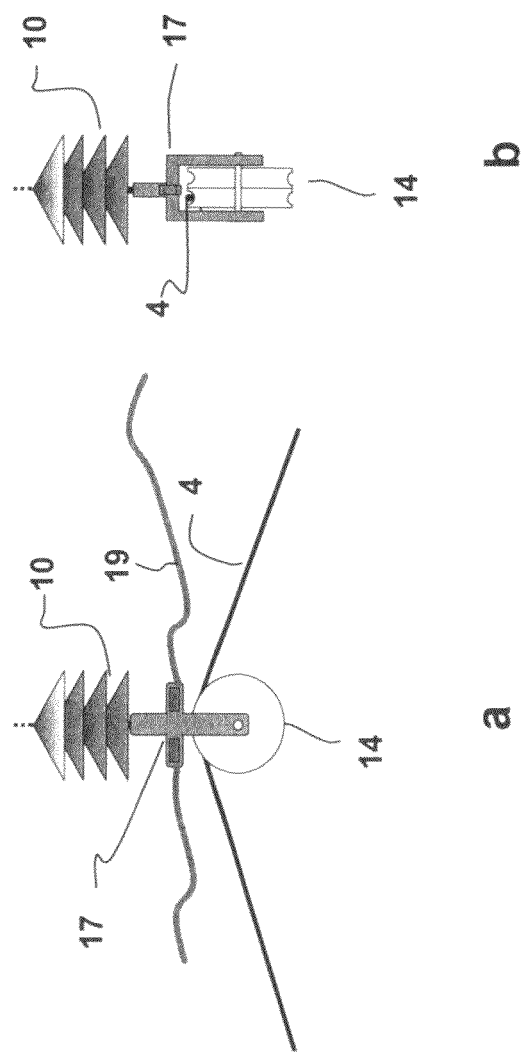
FIGS. 12*a* and 12*b* illustrate step 1 of an inventive live-line reconductoring set-up procedure at the pulling end of the reconductoring line section.

It is useful to disclose an example procedure by which a transmission line can be readied to undertake the replacement process described in FIG. 4. FIGS. 12a and 12b illustrate the bottom of a representative insulator string 10 following replacement of a permanent clamp by the stringing block 14.

A flexible jumper 19 has been permanently clamped to the stringing block frame 17. That jumper is capable of carrying full line current as well as sustaining full conductor tension. The stringing block 14 is also equipped with a double sheave as shown in FIG. 12b, only one of which is used at this point.

Figure 13:
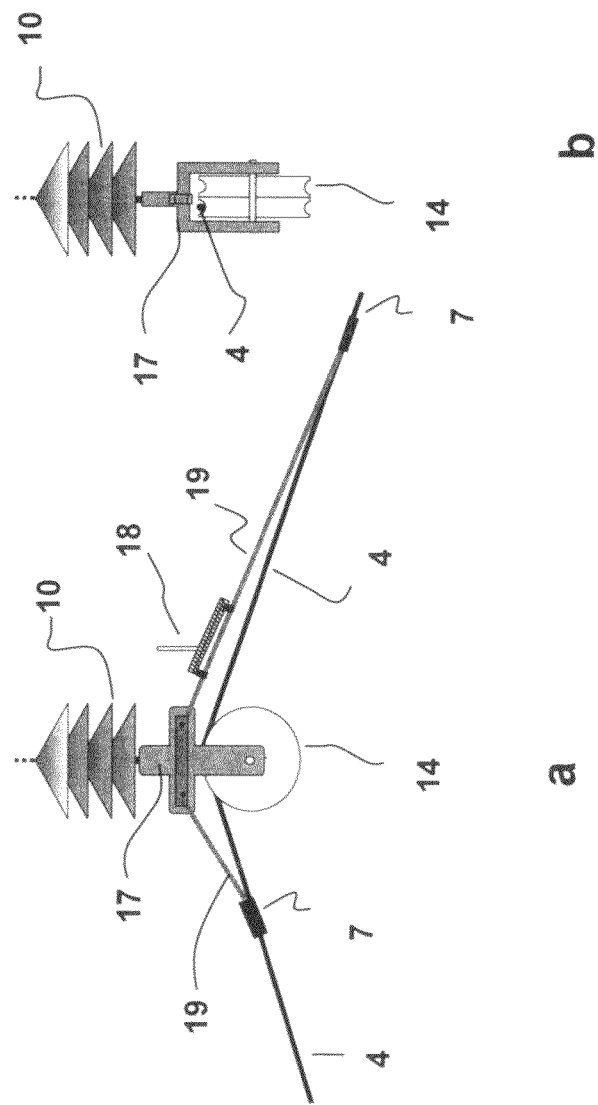
FIGS. 13*a* and 13*b* illustrate step 2 of the live-line reconductoring set-up procedure at the pulling end of the reconductoring line section.

In FIGS. 13a and 13b, the flexible jumper 19 has been attached to the conductor 4 by a jumper coupler 7 close to the left side of the stringing block frame 17 and several meters to the right, to conductor 4 by a similar coupler 7. The latter section of the flexible jumper is paralleled by a come-along 18. That come-along may be built as an integral part of the stringing block frame. The end view of the sheave in FIG. 13b omits, for clarity, representation of the flexible jumper 19 and come-along 18.

Figure 14:
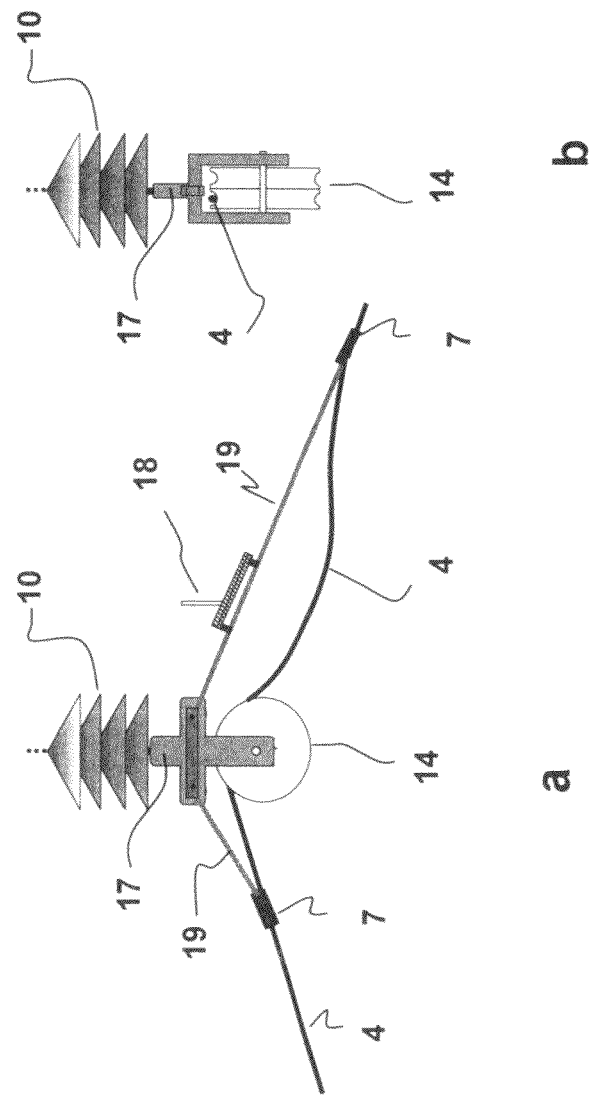
FIGS. 14*a* and 14*b* illustrate step 3 of the live-line reconductoring set-up procedure at the pulling end of the reconductoring line section.

In FIGS. 14a and 14b the come-along 18 has been used to pull tension on the right hand section of conducting jumper 19 so as to create slack in the primary conductor 4.

In FIGS. 15a and 15b the primary conductor 4, now slack, has been cut to the right of the stringing block 14. The right side of the cut remains unattached. The left side is connected to a temporary guy 16 by means of a coupler 6. Inserted in the temporary guy 16 is an auxiliary insulator 15. The lower end of the temporary guy 16 is connected to a ground anchor 12 through a tensioning device or come-along 20. Each of the temporary guy 16, auxiliary insulator 15, come-along 20 and ground anchor 12 are existing devices, known in the art.

Figure 16:
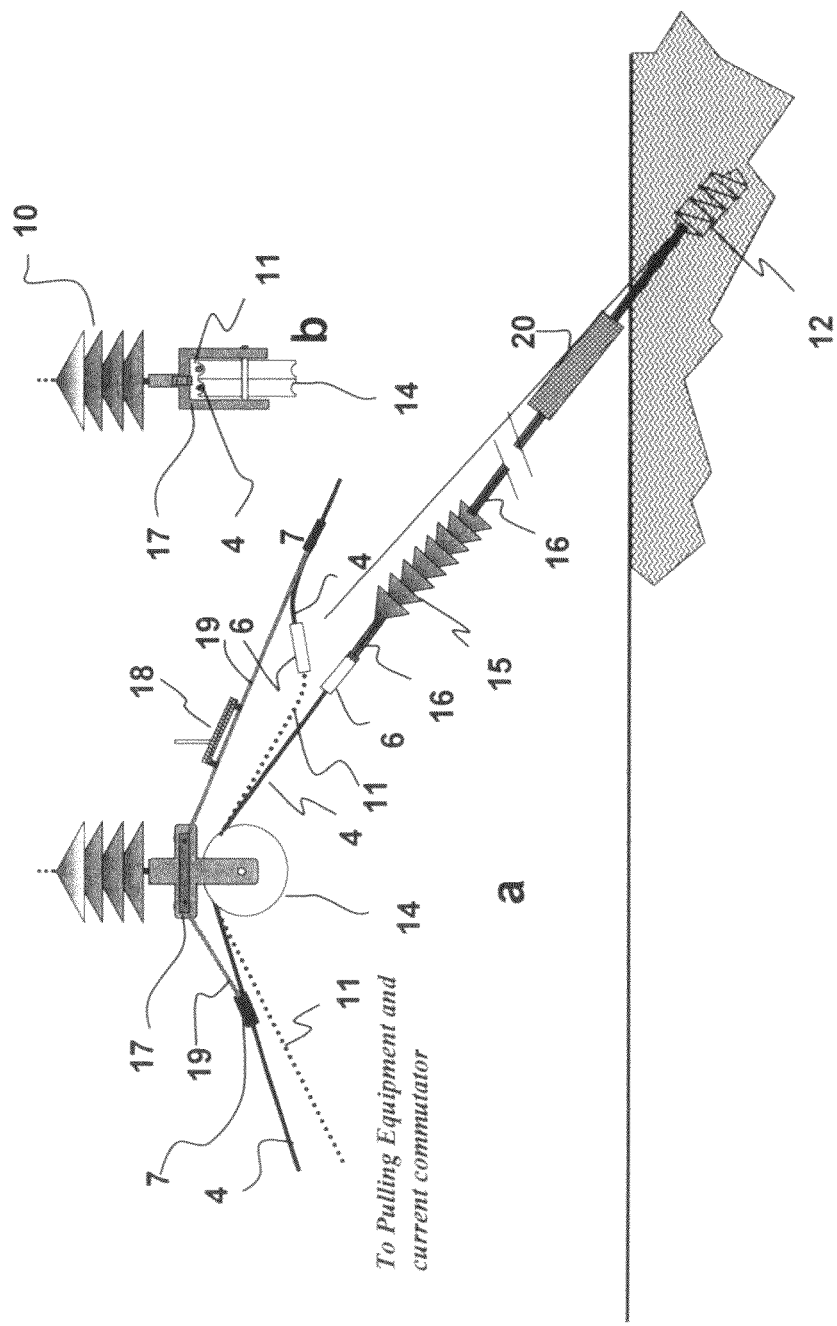
FIGS. 16*a* and 16*b* illustrate step 5 of the live-line reconductoring set-up procedure at the pulling end of the reconductoring line section.

FIGS. 16a and 16b show that a lead cable 11 has been threaded through the second sheave in the stringing block and attached to the loose end of conductor 4 by means of a coupler 6. That lead cable is supplied from a puller to the left of the figure but not shown.

Figure 17:
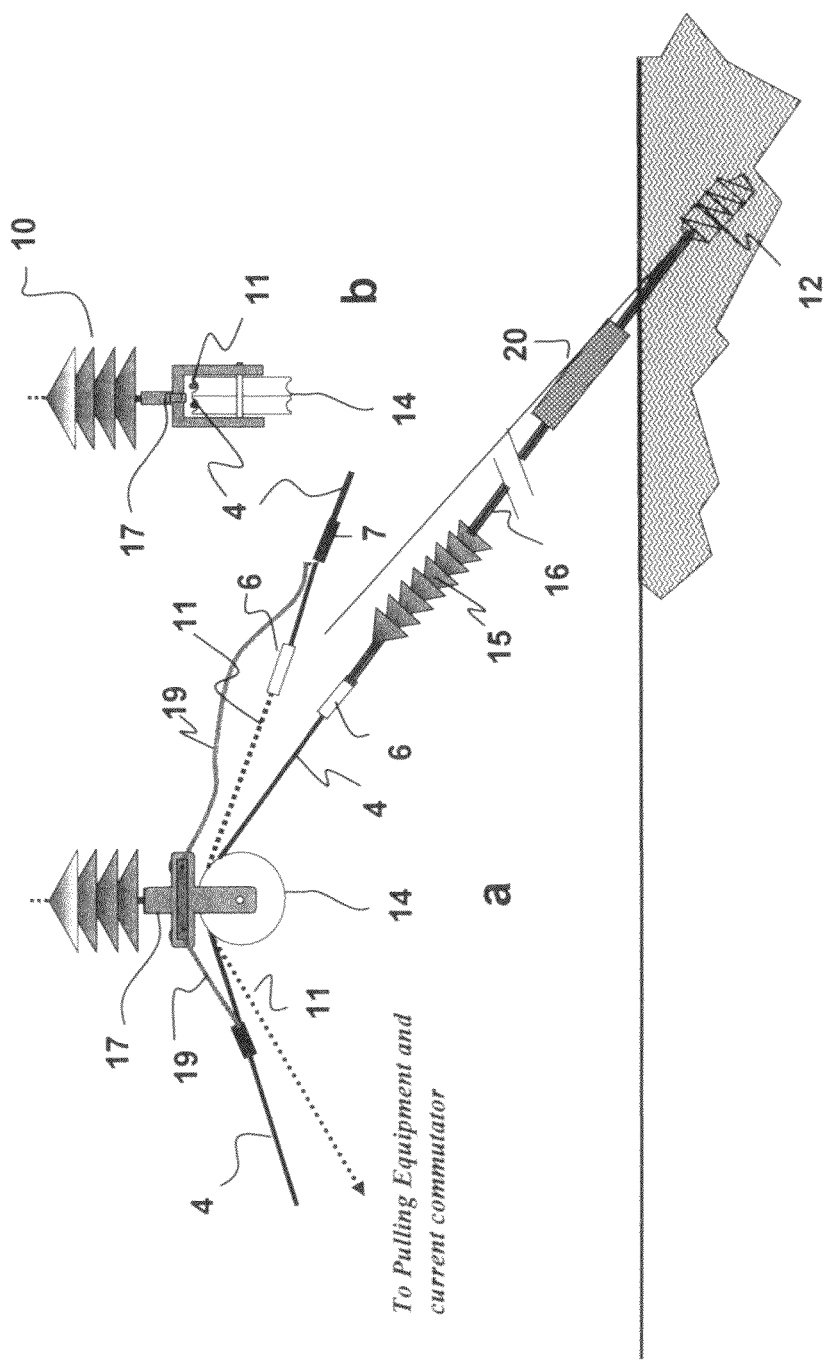
FIGS. 17*a* and 17*b* illustrate step 6 of the live-line reconductoring set-up procedure at the pulling end of the reconductoring line section.

In FIG. 17a the puller has taken up slack on the lead cable 11 and the come-along or tensioning device 20 has taken up additional slack on conductor 4 to the point where the system is in mechanical equilibrium but where tension is relieved on both sides of temporary jumper 19. The figure shows the come-along 20 now removed, for sake of clarity.

Figure 18:
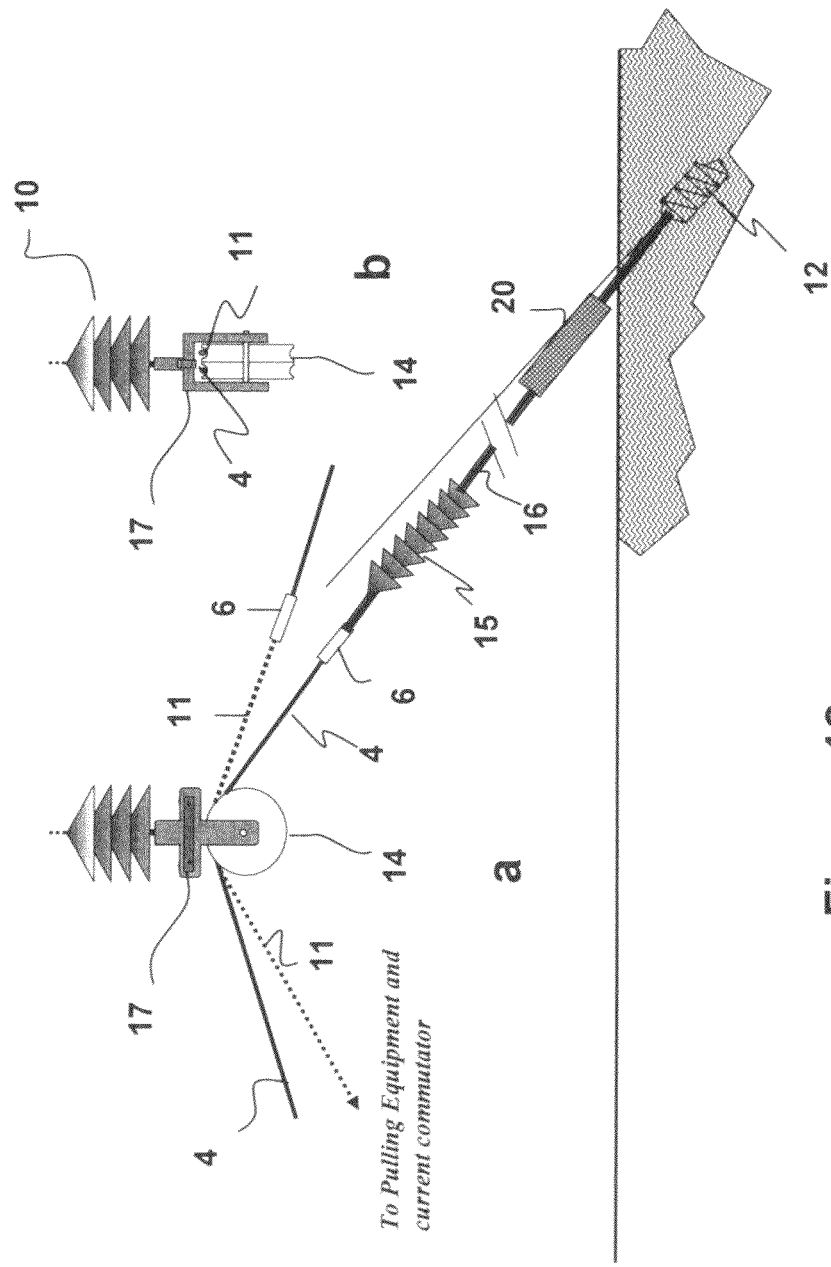
FIGS. 18*a* and 18*b* illustrate step 7 of the live-line reconductoring set-up procedure at the pulling end of the reconductoring line section.

FIG. 18a shows the temporary jumper 19 removed, conductor 4 on towers to the left of the pulling point anchored to ground, and the puller prepared to use the lead cable to pull the conductor 4 to the right of the pulling point onto a take-up real. The same conductor 4, at the tensioning end of the pulling section (not shown in FIG. 18) will be used to pull in a new conductor 8.

Figure 19:
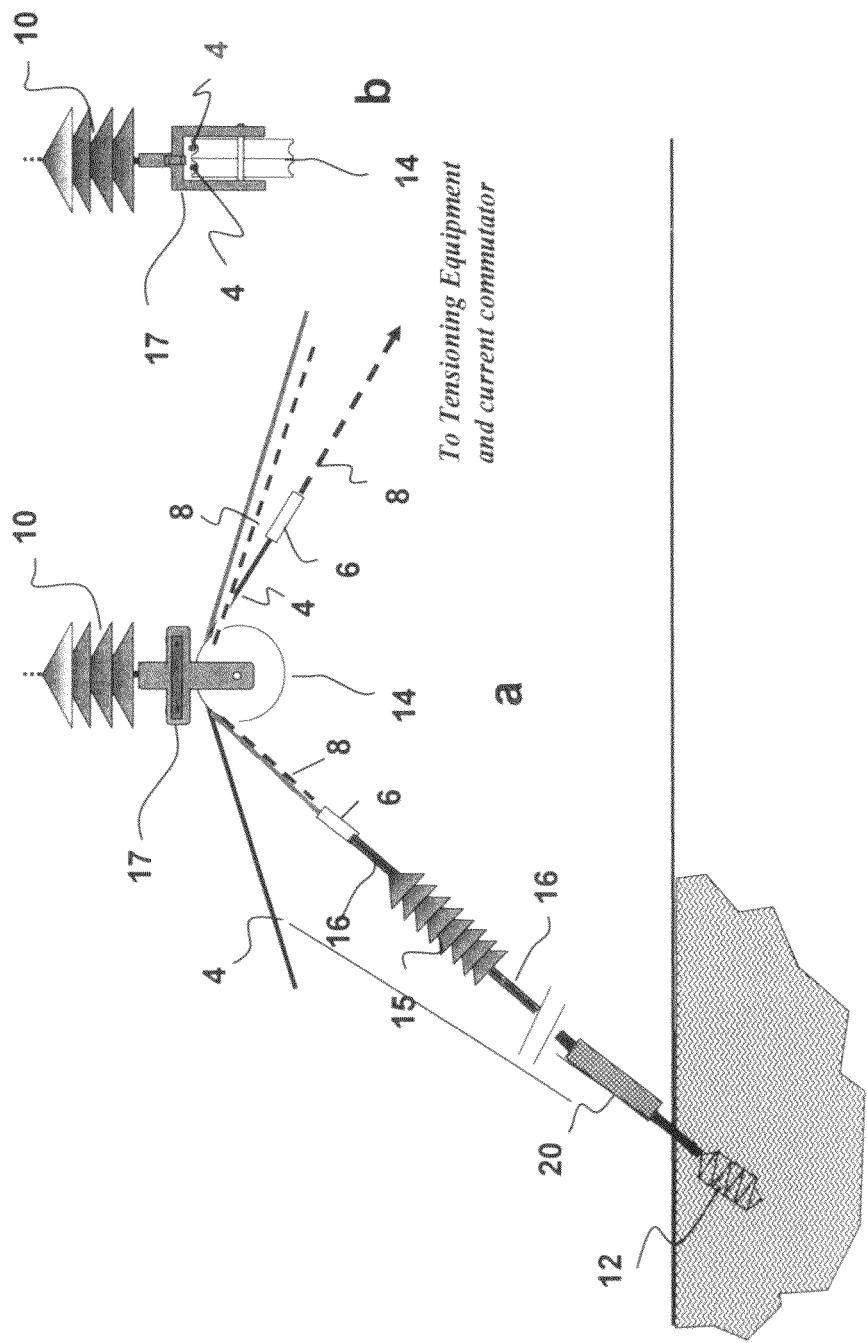
FIGS. 19*a* and 19*b* illustrate step 7 of the live-line reconductoring set-up procedure at the tensioning or conductor-supply end of the reconductoring section.

FIGS. 12 through 18 detailed preparatory procedures at the pulling end of a re-stringing section. Preparations at the tensioning (new cable supply) end of the section to be pulled are identical to those cited in the foregoing figures except reversed left to right. The result, as shown in FIGS. 19a and 19b, will also be reversed. The conductor to the right of the figure (presumably already re-strung) 8 is anchored through a temporary guy 16 and its associated insulator 15. In this case the conductor to the left of the figure (to be replaced) is attached to a supply of new conductor 8 by coupler 6. With preparations complete, the puller will increase tension slightly above the braking tension and new conductor 8 will be transported over the section of line being restrung, pulled into place by the old conductor 4.

Sag Control

As a new conductor 8 in FIG. 4, is pulled into place at full line potential and carrying full line current, it is critical that tension be controlled to assure that neither the old (pulling) conductor 4 nor the new (pulled) conductor 8 drop below safe minimum line-to-earth clearances between towers. A number of prior art techniques and instrumentation approaches can be used to control sag. That task is made more challenging by differences in elevation along the section of line to be strung.

As background for the usefulness of a device to mitigate this risk, it will be helpful to review certain simple sag and tension principles briefly.

Figure 20:
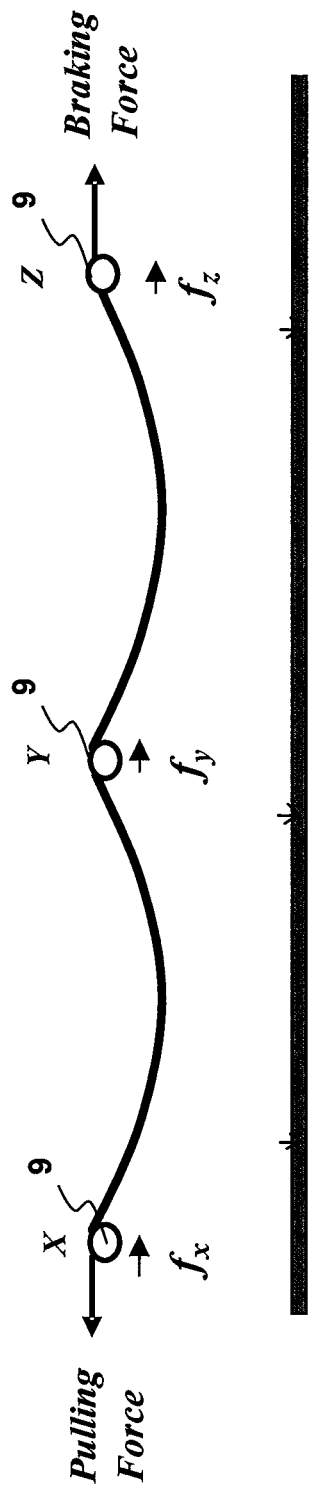
FIG. 20 illustrates two idealized prior art spans where all stringing blocks have zero friction.

FIG. 20 shows a simple schematic of two identical spans in which clamps have been replaced by stringing blocks 9. Pulling is to be from right to left. The system is presumed to be in equilibrium with equal pulling and braking forces. Sag in both spans will be equal for the static case. If sheave frictions $f_x$, $f_y$, and $f_z$ are all zero, sags will also be equal during a pulling operation, where pulling force is caused to incrementally exceed braking force.

Figure 21:
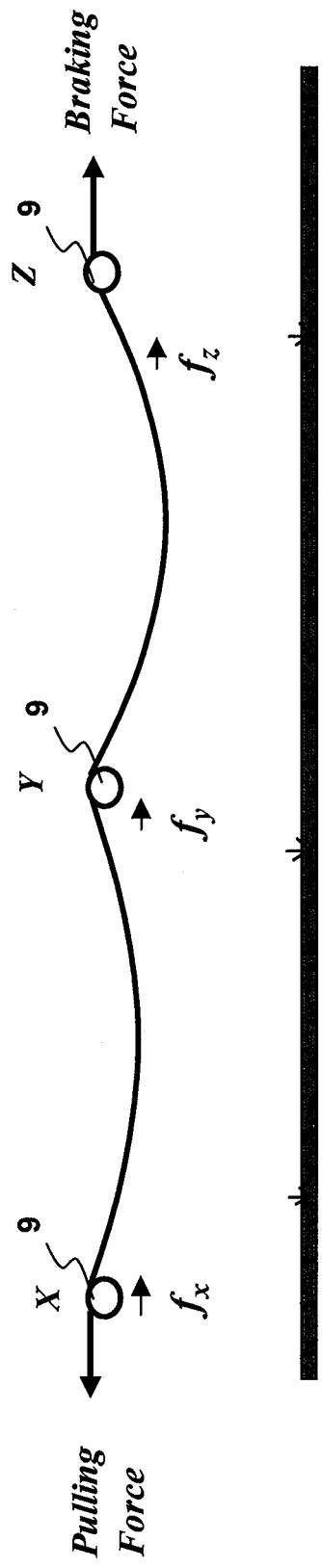
FIG. 21 illustrates the reduction in sag of the arrangement of FIG. 20 while pulling due to friction in block Y.

Suppose that each block has a finite friction, $f_x$, $f_y$, and $f_z$ respectively. Then in order that there be any motion in the conductor comprising the Y-Z span, the pulling force must be increased by $f_x$. If there is to be conductor motion both in spans X-Y and Y-Z, pulling force will have to be increased by $f_x+f_y$, and if there is to be net movement of conductor over the three sheave system shown, pulling force must be increased by $f_x+f_y$, $+f_z$. At the point where travel has been achieved in span X-Y and is just at the breaking point in span Y-Z, the case illustrated by FIG. 21, tension in span X-Y will be greater than in span Y-Z by the friction force $f_y$. Higher tension means lower sag for that span. At the point where net conductor travel from left to right just begins, the force and tension in span Y-Z will be greater than the braking force by $f_z$. In other words, introduction of friction in any one block will increase pulling force and tension in all down-pull spans. Although in practical cases sheave friction is very low, it will be shown that the foregoing characteristic can be used to advantage in sloped terrain.

Figure 22:
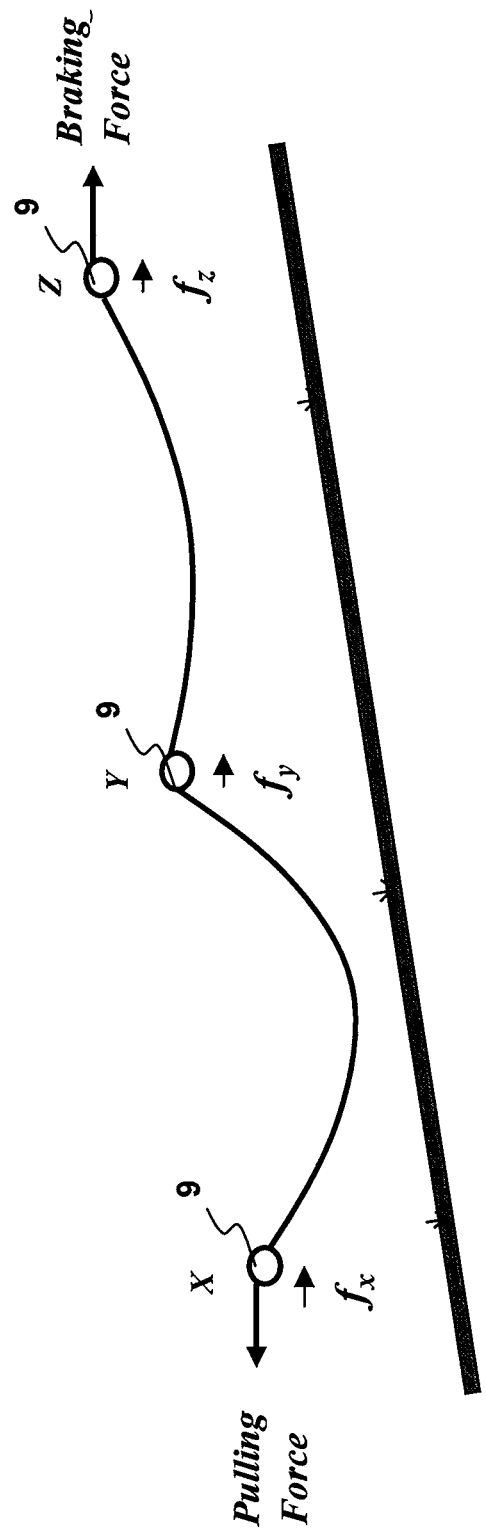
FIG. 22 illustrates the effect of a difference in conductor elevation on sag of the arrangement of FIG. 20.

FIG. 22 shows an exaggerated sag distortion due to a slope. In this case gravity will cause the conductor to roll down hill and higher tension in the upper span must restrain it. In FIG. 22, which assumes frictionless sheaves, as the conductor is pulled from right to left the tension in span Y-Z will always be greater than in span X-Y by the weight per foot of conductor times the difference in elevation of point Y and X.

Figure 23:
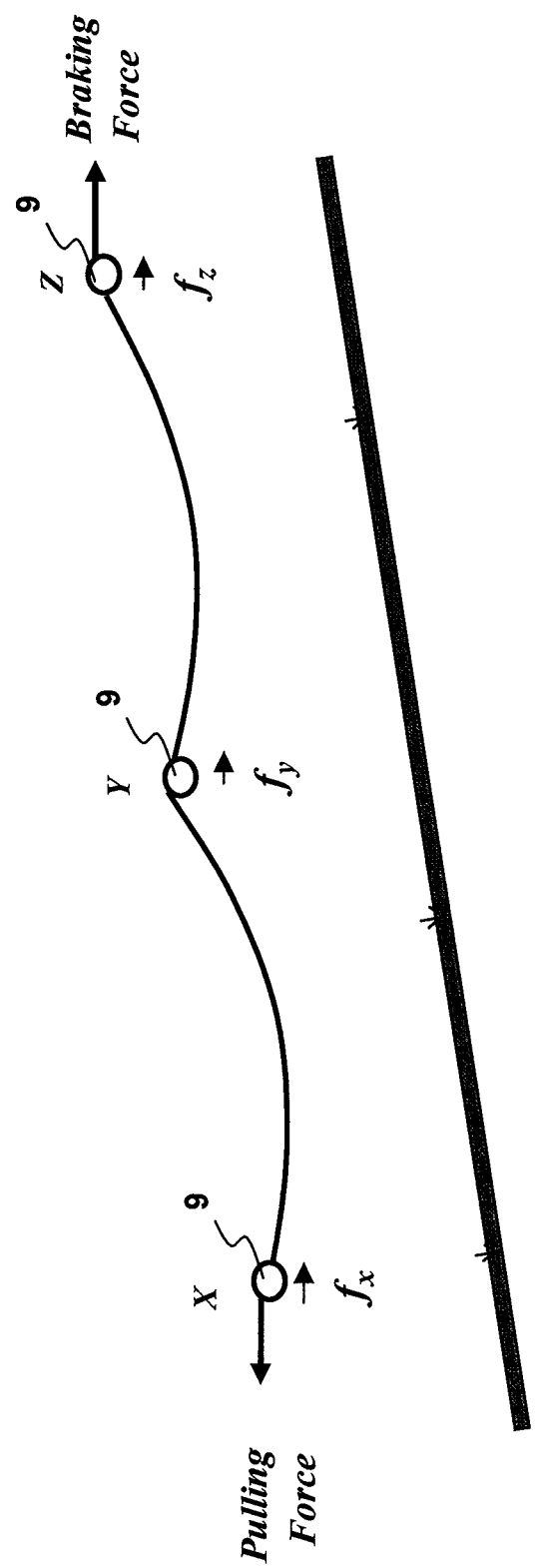
FIG. 23 illustrates the ability of deliberately introduced friction in block Y by way of the invention to equalize sag.

In FIG. 23, $f_x$ and $f_z$ are assumed to be zero but $f_y$ has been deliberately adjusted to be equal to the weight of conductor times the difference in elevation of points Y and X, so that as the conductor is pulled to the left both spans X-Y and X-Z see equal tensions and, assuming equal span length, equal sags. $f_y$ is essentially taking up a portion of the braking force otherwise born by the tensioner at the right end of the line section.

If the friction in each block on a constant downhill pull were made exactly equal to the weight force added by the drop in elevation between that block and the block immediately downhill, then it would be possible to make tension equal in each span. The friction needed to achieve that goal is easily calculable from the elevation profile of the line being restrung. If individual pre-stringing friction settings are set properly, elevation-related sag differences can be made very small. The same approach applied to a series of uphill spans would require that the block contribute energy rather than absorb it, i.e. that the block be equipped with an auxiliary engine. In the latter case it would obviously be more practical to reverse stringing direction so as to string in a downhill direction.

Figure 24:
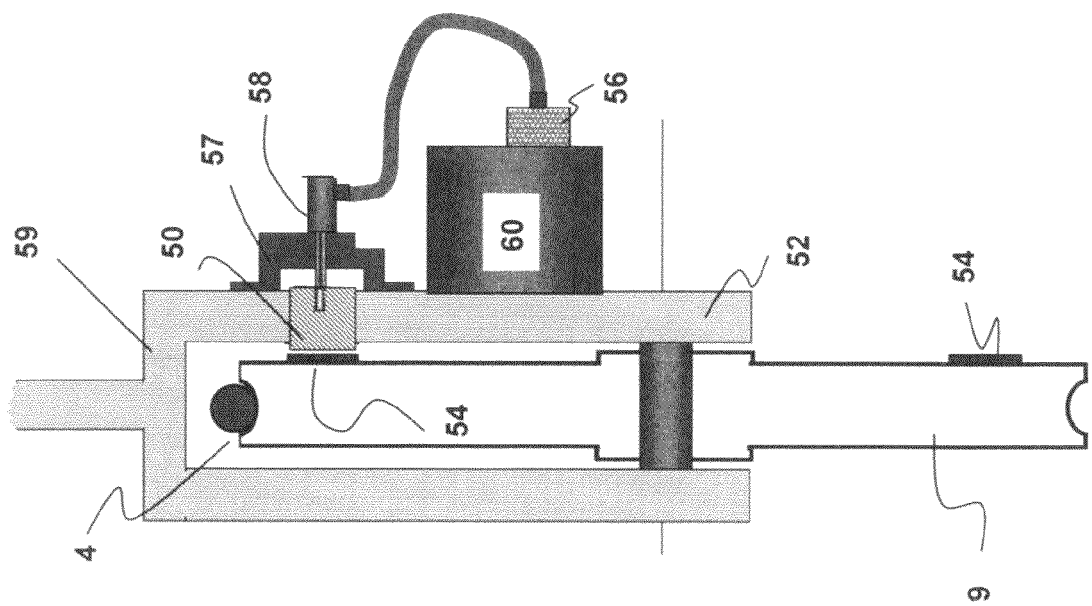
FIG. 24 illustrates the combination of a stringing block and friction device according to an embodiment of the invention.

FIG. 24 shows a preferred embodiment of a friction block 59 for the invention in which a brake disk 54 is affixed to one or both sides of the sheave 9, supported in turn by the traveler frame 52. The force on a brake shoe 50, which is capable of being pressed against the brake disk, is controlled by either a hydraulic or pneumatic piston 58 held in place by frame 57. Piston 58 is supplied by a source of pressure from an on-board reservoir 60, controlled by a pressure-regulating device 56.

Brake pressure may also be set manually by a prior art spring and screw-based system. By mounting a similar braking system on both sides of the sheave 9, both friction per brake element and heat dissipation requirements per element are halved and torsional force on the axle is eliminated.

While the elements of a braking system are individually known, their embodiment into a stringing block is a part of the invention described herein.

Broken Conductor Protection

The consequence of a conductor breaking during live-line restringing is more serious than when stringing un-energized conductors. The exposure to breakage is also greater inasmuch as (a) the conductor is old and potentially damaged and (b) both conductor and splices are subject to flexure as they travel over stringing blocks and around the bull wheels in the puller where multiple, closely spaced flexures results. It is therefore important to accommodate the possibility of conductor breakage within the puller apparatus; much less so than with the tensioner which is less likely to require a bull wheel and also contains newly manufactured conductor with no splices.

Figure 25:
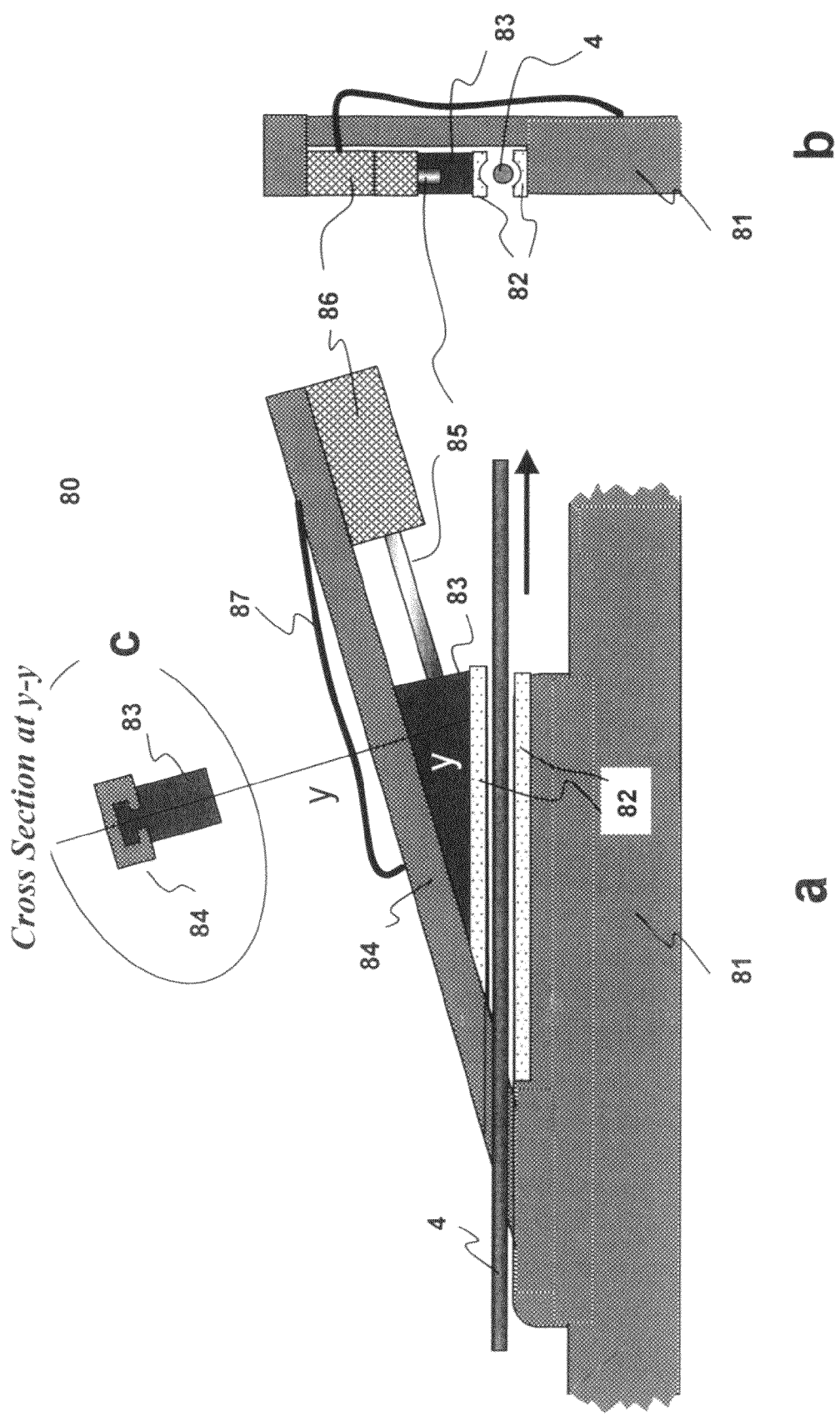
FIGS. 25*a*, 25*b* and 25*c* illustrate a jam clamp capable of preventing reverse travel of a conductor according to an embodiment of the invention.

FIG. 25 shows the preferred embodiment of an anti-reversal device in the form of a jam clamp, functionally identified as 80 in FIG. 4. In this preferred embodiment a triangular wedge 83 is free to slide along the axis of the upper frame 84 within a slot configuration shown in FIG. 25 *c*. Upper frame 84 and lower frame 81 are rigidly connected to one another and, as will be shown later, to the frame of the puller itself. Friction plates 82, comprised of high friction material such as that used for brake shoes, is affixed to the lower surface of the wedge 83 and the upper surface of the lower frame 81. The direction of the old conductor, being pulled onto a take up reel, is shown by the arrow in FIG. 25, reversed in pulling direction assumption from previous illustrations. A conductor break will cause the conductor to reverse direction and move from right to left. Upon detection of direct reversal (discussed below), the wedge 83 is forced to the left by a shaft 85, driven either by a mechanical, pneumatic, or hydraulic device 86. Contact between the wedge 83 and the conductor 4 drives the wedge further to the left, increasing clamping pressure on the conductor. Wedging action will increase clamping pressure on the conductor 4 to a very high level thereby arresting its motion.

Figure 26:
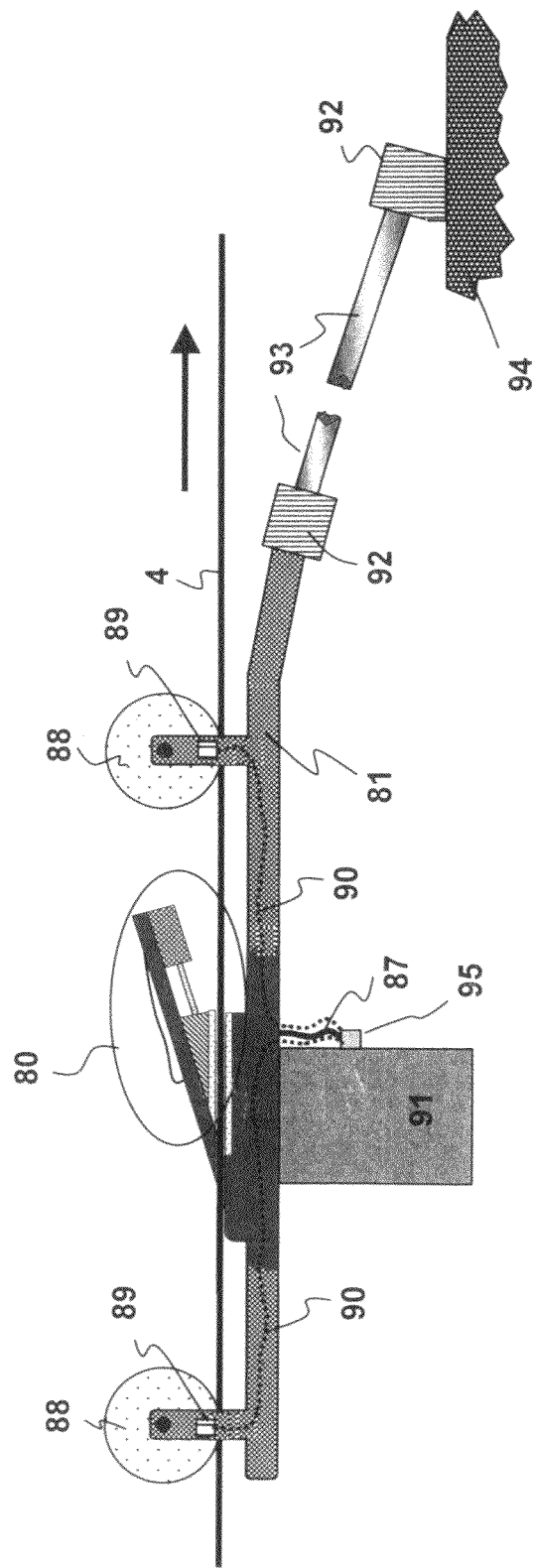
FIG. 26 illustrates the manner of suspension of a jam clamp according to an embodiment of the invention.

FIG. 26 shows the jam clamp assembly in its preferred application context. The assembly is suspended by two support wheels 88 which ride on top of the conductor close to the puller. The jam clamp assembly, on a rigid high strength frame 81 is mechanically connected to a shaft 93 by means of a universal joint 92. The lower end of shaft 93 is attached to the frame 94 of the puller through another universal joint 92. Thus the shaft 93 serves to (a) hold the jam clamp at an appropriate distance from the bull wheels, (b) allow the jam clamp to accommodate changes in conductor angle and position and (c) hold the conductor should it break at any point to the right of the jam clamp location. It will be seen from FIG. 4 that the jam clamp need not be capable of carrying current since the current transfer device picks up line current before it reaches the puller.

The jam clamp may be caused to operate by several means, including the response of a tensiometer (not shown) placed on the conductor between the jam clamp assembly and the puller or by rotation direction sensors on the support wheels 88. The latter could be either optical or mechanical sensors 89, both known in the art. The reverse rotation signal may be transmitted by electrical, hydraulic, or pneumatic means 90 to a control unit 95 which activates the wedge 83 in FIG. 25, by an electrical, hydraulic, or pneumatic transport means 87.

An on-board energy storage system and power source of the type known in the art 91 for activation of the jam clamp 83 is shown in FIG. 26. It also serves as a weight to assure that the system remains vertical and that the support wheels 88, ride securely on the conductor 4.

Description of Short Interruption Embodiment

Figure 15:
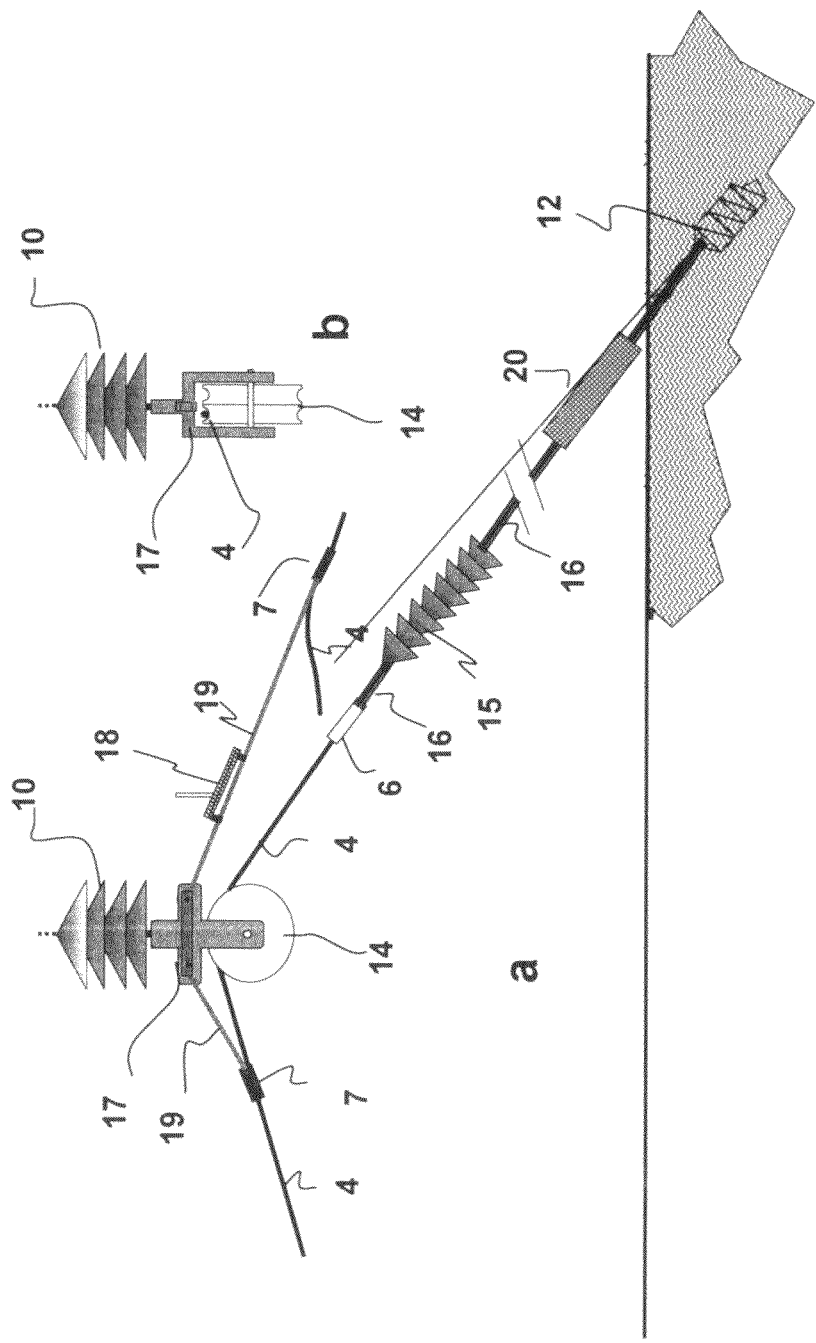
FIGS. 15*a* and 15*b* illustrate step 4 of the live-line reconductoring set-up procedure at the pulling end of the reconductoring line section.

The procedures and equipment cited above for uninterrupted embodiment can be achieved with conventional equipment operating at ground potential if, while the line remains energized:

a. Prior art hot-line methods are used to replace permanent clamps 7 with double sheave stringing blocks 14 on towers 201 and 220, the first and last towers in the stringing section and by single sheave stringing blocks in intermediate towers, e.g. from tower 202 to tower 219 inclusively in FIG. 4.

b. The procedures illustrated in FIGS. 12 through 19 are used at both ends of the pulling section except that an insulator assembly such as that identified as 15 in FIG. 15, is used to separate the puller or tensioner from the live conductor to which it is attached.

Once that configuration is achieved at both towers 201 and 220, the line may be de-energized, the insulator assembly 15 mechanically bypassed and then removed, and conventional prior art pulling operation undertaken.

Thus the transmission may be taken out of service during a period of light system loading for several hours while the old conductor is used to pull in the new conductor in the manner described in the no-interruption case above, except with both puller and tensioner at ground potential and without the need for provisions to transfer of current from one conductor to another.

The foregoing has the advantage of using conventional equipment but the disadvantage of (a) requiring line interruption during the actual pulling operation, (b) limiting the length of line which can be pulled per day with a given equipment set-up and (c) creating a risk that the transmission line will be unavailable for service if delays or difficulties are encountered in the pulling in of the new conductor.

With respect to the above description then, it is to be realized that the optimum relationships for the elements of the invention, to include variations in size, materials, shape, form, function and manner of operation, assembly and use, are deemed apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will occur to those skilled in the art, it is not desired to limit the invention to the exact construction and operation shown and described, and accordingly, all suitable modifications and equivalents may be resorted to, falling within the scope of the invention.

What is claimed is:

1. A method of replacing a live, existing overhead electric transmission line conductor that is supported by a series of spaced towers and that is carrying an electrical load, with a replacement conductor, comprising:

providing a replacement conductor;

physically and electrically coupling the replacement conductor to the live existing conductor, such that the replacement conductor is carrying an electrical load;

providing a conductor pulling assembly that is adapted and arranged to pull a conductor;

physically coupling the existing conductor to the pulling assembly; and operating the pulling assembly to move the live existing conductor and thereby also move the live replacement conductor, to thereby replace at least part of the live existing conductor from one or more of the series of spaced towers with the live replacement conductor.

2. The method of claim 1 further comprising providing a take-up reel at the pulling assembly and inhibiting release of a conductor being wound onto the take-up reel, said release due to conductor or joint breakage.

3. The method of claim 2 in which inhibiting release of a conductor comprises providing a wedge that is moved into a position which prevents motion of said conductor in one direction.

4. The method of claim 1 in which current is transferred from a fixed point to a moving conductor and from a moving conductor back to a fixed point.

5. The method of claim 4 in which the current transfer is achieved using plurality of rotating contactor wheels mounted in mechanical opposition to one another so as to provide a clamping action while a conductor passes over the wheels.

6. The method of claim 5 in which the contactor wheels each define multi-plane surfaces to enable contact with more of the circumference of the conductor than could be made with a single plane surface.

7. The method of claim 5 in which the rotating contactor wheels are configured to spread apart to accept one or more conductors and then close to make firm electrical and mechanical contact with said one or more conductors.

8. The method of claim 4 in which the current transfer is achieved using a plurality of rotating contactor wheels, one or more of which carries current from the existing conductor, through the wheel, and then through a liquid metal based contactor or vice versa.

9. The method of claim 5 in which the contactor wheels are mechanically coupled to a boom which may be insulated, in order to align said contactor wheels with a conductor.

10. the method of claim 1 further comprising:
providing a conductor tensioning assembly that is adapted and arranged to place tension on a conductor; and
physically coupling the existing conductor to the tensioning assembly so as to maintain tension on the existing conductor as it is moved by the pulling assembly.

11. The method of claim 10 wherein the pulling assembly and the tensioning assembly are both electrically coupled to the live existing conductor.

12. The method of claim 11 further comprising providing insulated support structures on which are located the pulling and tensioning assemblies, to insulate the pulling and tensioning assemblies from ground potential.

13. The method of claim 1 wherein the electrical coupling of the replacement and existing conductors is accomplished at least in part by providing double sheave devices coupled to the spaced towers, and running each of the conductors over a separate one of the sheaves.

14. The method of claim 13 further comprising anchoring the existing conductor at one location and anchoring the replacement conductor at a different location.

15. The method of claim 13 further comprising accomplishing controlled friction in selected sheaves, to reduce conductor sag between sheaves.

16. A method of replacing a live existing overhead electric transmission line conductor that is supported by a series of spaced towers and that is carrying an electrical load, with a replacement conductor, comprising:
providing a replacement conductor;
physically and electrically coupling the replacement conductor to the live existing conductor, such that the replacement conductor is carrying an electrical load;
providing a conductor pulling assembly that is adapted and arranged to pull a conductor;
physically and electrically coupling the existing conductor to the pulling assembly;
providing a conductor tensioning assembly that is adapted and arranged to place tension on a conductor;
physically and electrically coupling the existing conductor to the tensioning assembly so as to maintain tension on the existing conductor as it is moved by the pulling assembly;
providing insulated support structures on which are located the pulling and tensioning assemblies, to insulate the pulling and tensioning assemblies from ground potential;
providing a plurality of rotating contactor wheels mounted in mechanical opposition to one another, wherein the existing and replacement conductors run over the wheels so as to accomplish a clamping action on the conductors as they pass over the wheels; and
operating the pulling assembly to move the live existing conductor and thereby also move the live replacement conductor, to thereby replace at least part of the live existing conductor from one or more of the series of spaced towers with the live replacement conductor.

17. The method of claim 16 wherein the contactor wheels each define multi-plane surfaces to enable contact with more of the circumference of the conductor than could be made with a single plane surface, wherein the contactor wheels are configured to spread apart to accept the conductors and then close to make firm electrical and mechanical contact with the conductors, and wherein one or more of the contactor wheels conduct current between the existing and replacement conductors through the wheel and through a liquid metal based contactor.

* * * * *